United States Patent
Yoshida et al.

(10) Patent No.: US 9,952,250 B2
(45) Date of Patent: Apr. 24, 2018

(54) RESONANT SENSOR

(71) Applicant: YOKOGAWA ELECTRIC CORPORATION, Musashino-shi, Tokyo (JP)

(72) Inventors: Yusaku Yoshida, Tokyo (JP); Takashi Yoshida, Tokyo (JP); Atsushi Yumoto, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 191 days.

(21) Appl. No.: 14/829,801

(22) Filed: Aug. 19, 2015

(65) Prior Publication Data

US 2016/0061857 A1   Mar. 3, 2016

(30) Foreign Application Priority Data

Aug. 28, 2014  (JP) ................................. 2014-173987

(51) Int. Cl.
*G01P 15/097* (2006.01)
*G01P 15/08* (2006.01)

(52) U.S. Cl.
CPC .... *G01P 15/097* (2013.01); *G01P 2015/0828* (2013.01)

(58) Field of Classification Search
CPC .................................................... G01P 15/097
USPC ...................................................... 73/514.29
See application file for complete search history.

(56) References Cited

U.S. PATENT DOCUMENTS

| | | | |
|---|---|---|---|
| 5,090,254 A | 2/1992 | Guckel et al. | |
| 5,233,874 A * | 8/1993 | Putty | G01P 15/0802 73/514.29 |
| 5,456,110 A | 10/1995 | Hulsing, II | |
| 6,595,054 B2 * | 7/2003 | Paros | G01C 19/5607 73/504.04 |
| 2007/0222011 A1 * | 9/2007 | Robert | G01C 19/574 257/415 |
| 2012/0060607 A1 | 3/2012 | Yoshida | |
| 2013/0112019 A1 | 5/2013 | Watanabe | |
| 2013/0139377 A1 | 6/2013 | Noda et al. | |
| 2015/0013456 A1 | 1/2015 | Hada et al. | |

FOREIGN PATENT DOCUMENTS

| | | |
|---|---|---|
| FR | 3000050 A1 | 6/2014 |
| JP | 46-12235 B | 3/1971 |
| JP | 7-6852 A | 1/1995 |
| JP | 7-6852 B2 | 1/1995 |
| JP | 9-500726 A | 1/1997 |
| JP | 9-96552 A | 4/1997 |

(Continued)

OTHER PUBLICATIONS

D.W. Burns, et al., "Sealed-cavity resonant microbeam accelerometer", Sensors and Actuators A, 1996, pp. 249-255, vol. 53.

*Primary Examiner* — John Chapman, Jr.
(74) *Attorney, Agent, or Firm* — Sughrue Mion, PLLC

(57) ABSTRACT

A resonant sensor includes a mover that is movable in a first direction, a supporter that extends in a second direction perpendicular to the first direction, the supporter being connected to the mover and a fixer, the supporter supporting the mover which is movable in the first direction, and a resonator that is vibratable, at least a part of the resonator being embedded in the supporter.

16 Claims, 19 Drawing Sheets

(56) References Cited

FOREIGN PATENT DOCUMENTS

| | | |
|---|---|---|
| JP | 3223358 B2 | 10/2001 |
| JP | 3544979 B2 | 7/2004 |
| JP | 2009-85808 A | 4/2009 |
| JP | 5158160 B2 | 3/2013 |
| JP | 2013-246083 A | 12/2013 |
| JP | 5429696 B2 | 2/2014 |
| WO | 95/03533 A2 | 2/1995 |
| WO | 95/07448 A1 | 3/1995 |
| WO | 2013161597 A1 | 10/2013 |

\* cited by examiner

RESONANT SENSOR

BACKGROUND OF THE INVENTION

Field of the Invention

The disclosure relates to a resonant sensor.

Priority is claimed on Japanese Patent Application No. 2014-173987, filed Aug. 28, 2014, the contents of which are incorporated herein by reference.

Description of Related Art

A resonant sensor has a weight having predetermined weight, a spring holding the weight, a damping member disposed near the weight, and a resonator embedded in the spring. For example, the resonant sensor measures acceleration by detecting a change of resonant frequency of the resonator caused by strain of the spring. The strain of the spring is generated in proportion to the acceleration. A detection of resonant frequency of the resonator, which includes resonant frequency changed by the strain, is performed by vibrating the resonator by using an exciting circuit and detecting the resonant frequency.

A natural frequency of the resonant sensor is determined in accordance with a weight of the weight and a spring constant of the spring. A damping characteristic of a frequency characteristic of the resonant sensor is changed in accordance with a size of a gap formed between the weight and the damping member and pressure in the gap. For the reason, if the size of the gap and the pressure in the gap are adjusted, the resonant sensor having a desired frequency characteristic according to the purpose of use can be implemented. The gap acts as a damper with respect to the weight.

The size of the gap and the pressure in the gap are adjusted so that the frequency characteristic of the resonant sensor becomes a characteristic of critical damping. On the other hand, the resonator embedded in the spring is vacuum-sealed so as to achieve a high Q value. Therefore, the resonant sensor is designed so that the pressure around the weight is different from the pressure around the resonator.

In the resonant sensor, in a frequency range lower than the natural frequency, the strain of the spring is generated in proportion to acceleration. In a frequency range around the natural frequency, the strain of the spring is generated in proportion to velocity. In a frequency range higher than the natural frequency, the strain of the spring is generated in proportion to displacement. Therefore, in addition to acceleration, the resonant sensor can measure jerk, velocity, displacement, and so on.

In Japanese Examined Patent Application Publication No. H7-6852, U.S. Pat. No. 5,090,254, Japanese Patent No. 3,223,358, and D. W. Burns et al., "Sealed-cavity resonant microbeam accelerometer", Sensors and Actuators A, Vol. 53, 1996, p. 249-255, a resonator which is the same as the resonator disposed in the resonant sensor is disclosed. In Japanese Patent No. 3,544,979, an accelerometer using resonant beam is disclosed. In Japanese Patent No. 5,158, 160 and Japanese Patent No. 5,429,696, a resonant transducer used for measuring pressure is disclosed.

In recent years, from a perspective of improving measurement accuracy, it is required to improve dynamic range of the resonant sensor. So as to improve the dynamic range of the resonant sensor, a stiffness of the spring is made lower (the spring is made soft), and the weight is made heavier (the displacement is larger with respect to input). Thereby, the strain of the spring is easily generated by an input acceleration. Therefore, the resonant sensor can be designed so that the strain (tensile strain and compression strain) added to the resonator becomes larger.

Even if the tensile strain becomes larger, creep or destruction of the resonator does not easily occur. However, if the compression strain becomes larger, the resonator is easily buckled. For example, the value of the tensile strain, at which the creep or the destruction of the resonator is generated, is approximately from one thousand [ppm] to several tens of thousands [ppm]. On the other hand, the value (absolute value) of the compression strain, at which the resonator is buckled, is approximately from several tens [ppm] to several hundred [ppm]. In this way, if the compression strain which is approximately from a hundredth to a thousandth of the tensile strain, at which the creep or the destruction of the resonator is generated, is added to the resonator, the resonator is buckled. Therefore, although the dynamic range of the input acceleration (positive input acceleration) which causes the tensile strain of the resonator can be expanded, it is difficult that the dynamic range of the input acceleration (negative input acceleration) which causes the compression strain of the resonator is expanded.

So as to improve the dynamic range of the resonant sensor, if the stiffness of the spring is made lower, or if the weight is made heavier and the strain added to the resonator becomes larger, amount of the change of the resonant frequency also becomes larger. Therefore, the resonant frequency of the resonator may be the same as the resonant frequency (including high-order mode) of the spring.

In a case that such situation occurs, if a bending direction of the spring is the same as a vibrating direction of the resonator, energy of the resonator is absorbed by the spring. As described above, the detection of resonant frequency of the resonator is performed by vibrating the resonator by using the exciting circuit and detecting the resonant frequency. However, in a case that such situation occurs, the energy for vibrating the resonator is absorbed by the spring, as a result, there is a problem that measurement accuracy is significantly worsened.

SUMMARY

A resonant sensor may include a mover that is movable in a first direction, a supporter that extends in a second direction perpendicular to the first direction, the supporter being connected to the mover and a fixer, the supporter supporting the mover which is movable in the first direction, and a resonator that is vibratable, at least a part of the resonator being embedded in the supporter.

Further features and aspects of the present disclosure will become apparent from the following detailed description of exemplary embodiments with reference to the attached drawings.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a resonant sensor which has wide dynamic range and can measure the acceleration or the like with high accuracy.

The resonant sensor of the present embodiment will be described below with reference to drawings. Although the resonant sensor in the embodiments can measure jerk, acceleration, velocity, and displacement, so as to be easily understood, the resonant sensor measuring the acceleration will be described as an example. Also, a position relationship of each member will be described with reference to an XYZ orthogonal coordinate system shown in figures (a position of origin is appropriately changed).

First Embodiment

<Resonant Sensor>

Figure 1:
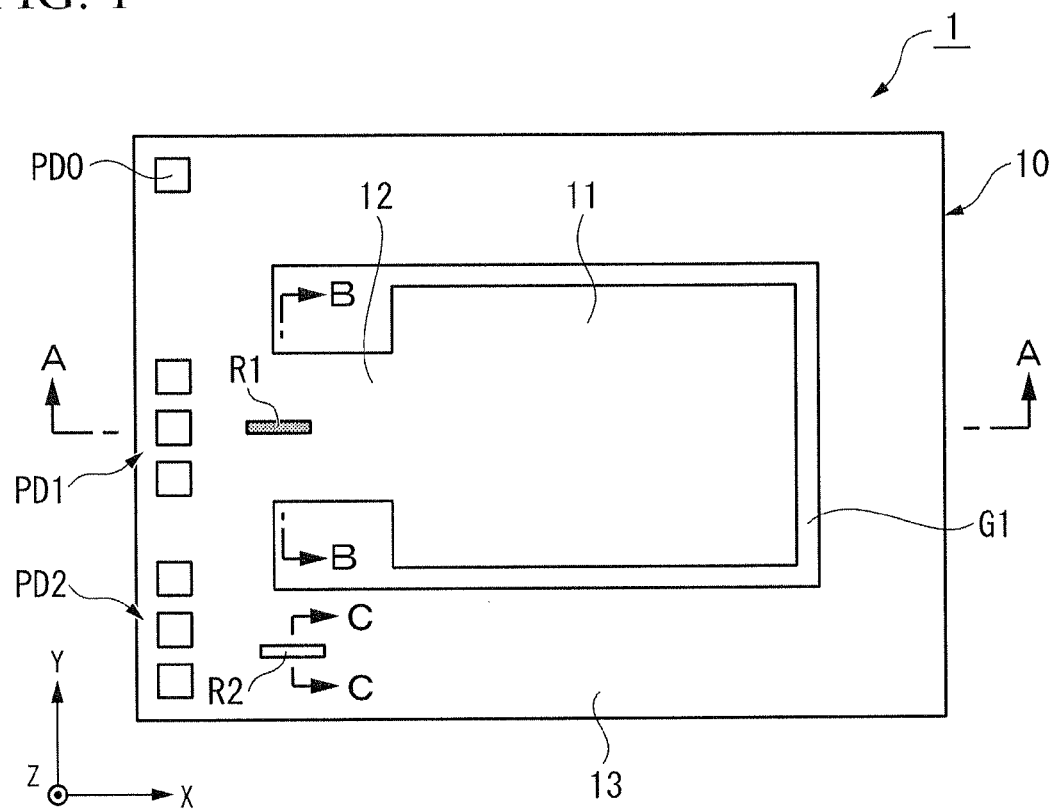
FIG. 1 is a plan view of the resonant sensor in the first embodiment.
Figure 2:
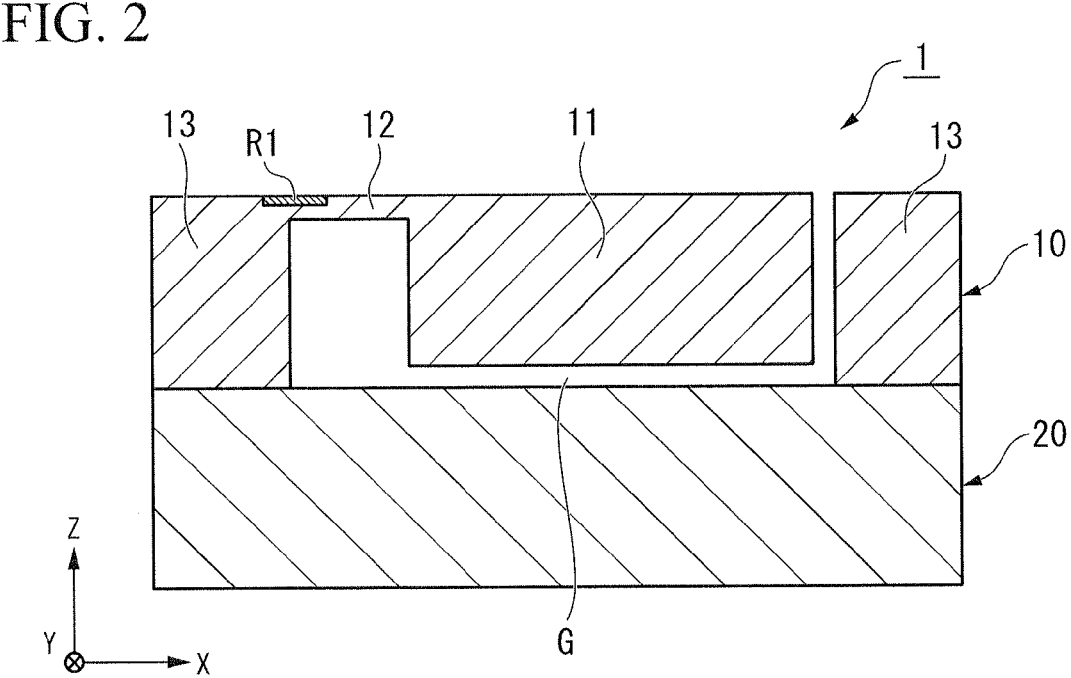
FIG. 2 is a sectional view on the line A-A shown in FIG. 1.

FIG. 1 is a plan view of the resonant sensor in the first embodiment. FIG. 2 is a sectional view on the line A-A shown in FIG. 1. As shown in FIG. 1 and FIG. 2, the resonant sensor 1 in the present embodiment has an acceleration detecting substrate 10 and a damping member 20. The resonant sensor 1 measures acceleration acting on the resonant sensor 1. The resonant sensor 1 is configured so that measurement sensitivity of the acceleration in a direction Z is the highest.

The acceleration detecting substrate 10 is a silicon substrate which has a weight 11 (mover), a spring 12 (supporter), a fixed frame 13 (fixer), and an acceleration detecting resonator R1 (resonator), a temperature detecting resonator R2, and aluminum pads PD0 to PD2. The acceleration detecting substrate 10 is configured so that the strain which is proportional to the acceleration acting on the resonant sensor 1 (acceleration in the direction Z) is generated in the spring 12, and the resonant frequency of the acceleration detecting resonator R1 is changed by the strain generated in the spring 12. The acceleration acting on the resonant sensor 1 is calculated in accordance with the change of the resonant frequency of the acceleration detecting resonator R1.

The weight 11 is formed by processing a silicon substrate. The weight 11 has predetermined weight. One end of the weight 11 (in FIG. 1, the end in a direction −X) is connected to the fixed frame 13 by the spring 12. On the other hand, another end of the weight 11 is apart from the fixed frame 13 with a constant gap G1. Thereby, the weight 11 can move in the direction Z (first direction) in which the measurement sensitivity of the acceleration is the highest.

The spring 12 is connected to the one end of the weight 11 and the fixed frame 13. The spring 12 supports the weight 11 so that the weight 11 can relatively move in the direction Z with respect to the fixed frame 13. A thickness of the spring 12 (width in the direction Z) is thinner than the weight 11 and the fixed frame 13. The spring 12 is formed to extend in the direction X (second direction). The weight 11 is displaced in the direction Z with respect to the fixed frame 13 so that the strain is generated in the spring 12. The spring 12, the weight 11, and the fixed frame 13 are formed as a single-piece by processing the silicon substrate.

The fixed frame 13 is a member supporting the weight 11 via the spring 12. The fixed frame 13 is formed by processing the silicon substrate to be rectangular and surrounds the weight 11 in the XY plane. As shown in FIG. 2, the fixed frame 13 is formed to be slightly thicker than the weight 11. This is because a predetermined gap G is formed between the weight 11 and the damping member 20. Although details will be described later, the gap G formed between the weight 11 and the damping member 20 acts as a damper with respect to the weight 11.

The acceleration detecting resonator R1 is disposed so as to detect the acceleration acting on the resonant sensor 1 (acceleration in the direction Z). The resonant frequency of the acceleration detecting resonator R1 is changed by the strain generated in the spring 12. A longitudinal direction of the acceleration detecting resonator R1 is along the direction X. The acceleration detecting resonator R1 is disposed in a position where the strain, which is added to the acceleration detecting resonator R1, becomes large as much as possible. It is desirable that, when the strain is generated in the spring 12, the acceleration detecting resonator R1 is disposed in a position where the strain, which is added to the acceleration detecting resonator R1, becomes the largest. At least a part of the acceleration detecting resonator R1 may be included in the spring 12. Therefore, a part of the acceleration detecting resonator R1 may be included in the weight 11 or the fixed frame 13.

Tensile strain in the direction X is preliminarily applied to the acceleration detecting resonator R1 having a crystal structure. The acceleration detecting resonator R1 is configured to vibrate (resonate) in a direction Y (third direction). The tensile strain is applied to the acceleration detecting resonator R1 in order to expand the dynamic range of the input acceleration (negative input acceleration) which generates the compression strain in the acceleration detecting resonator R1. In other words, the tensile strain is applied to the acceleration detecting resonator R1 not to easily generate the buckle of the acceleration detecting resonator R1, so that the dynamic range of the negative input acceleration can be expanded.

For example, the tensile strain acting on the acceleration detecting resonator R1 in the direction X is applied by diffusing impurities in the acceleration detecting resonator R1. Atomic radius of the impurity is smaller than atomic radius of the material of the acceleration detecting resonator R1. For example, in a case that the acceleration detecting resonator R1 is made of silicon, the tensile strain is applied by diffusing impurities such as boron (B) and phosphorus (P).

Even if the resonant frequency of the acceleration detecting resonator R1 is the same as the resonant frequency of the spring 12 (including high-order mode), it is necessary to prevent the measurement accuracy of the acceleration from being worsened. Therefore, the acceleration detecting resonator R1 vibrates in the direction Y. Specifically, a vibrating direction of the acceleration detecting resonator R1 is set to be the direction Y which is perpendicular to the direction Z which is a vibrating direction of the spring 12, so that it can be prevented that the energy for vibrating the acceleration detecting resonator R1 is absorbed by the spring 12. Thereby, it can prevent the measurement accuracy of the acceleration from being worsened.

The acceleration detecting resonator R1, the weight 11, the spring 12, and the fixed frame 13 are formed as a single-piece by processing the silicon substrate. In this way, by integrally forming the acceleration detecting resonator R1 in addition to the weight 11, the spring 12, and the fixed frame 13 without adhesive, temperature characteristics, hysteresis, and long term stability can be improved. The acceleration detecting resonator R1 is vacuum-sealed. The specific configuration of the acceleration detecting resonator R1 will be described later.

The temperature detecting resonator R2 is disposed so as to measure the temperature in the resonant sensor 1 (temperature which is approximately the same as the temperature of the acceleration detecting resonator R1). The temperature detecting resonator R2 is embedded in the fixed frame 13. The temperature detecting resonator R2 may be embedded in the weight 11 or spring 12 instead of the fixed frame 13. A detection result of the temperature detecting resonator R2 is used for correcting the detection result (resonant frequency) of the acceleration detecting resonator R1 by the temperature. Therefore, the temperature detecting resonator R2 is disposed near the acceleration detecting resonator R1 as much as possible. The specific configuration of the temperature detecting resonator R2 will be described later.

The aluminum pad PD1 is an electrode electrically connected to the acceleration detecting resonator R1. The aluminum pad PD1 is disposed on the fixed frame 13 with respect to the acceleration detecting resonator R1. An exciting signal for vibrating the acceleration detecting resonator R1 is supplied from outside to the aluminum pad PD1. A detection signal (a signal of which frequency is the same as the resonant frequency of the acceleration detecting resonator R1) is output from the acceleration detecting resonator R1 to the aluminum pad PD1.

The aluminum pad PD2 is an electrode electrically connected to the temperature detecting resonator R2. The aluminum pad PD2 is disposed on the fixed frame 13 with respect to the temperature detecting resonator R2. An exciting signal for vibrating the temperature detecting resonator R2 is supplied from outside to the aluminum pad PD2. A detection signal (a signal having a frequency according to the temperature) is output from the temperature detecting resonator R2 to the aluminum pad PD2. The aluminum pad PD0 is an electrode (an aluminum pad for shielding) disposed for preventing the influence of noise. The aluminum pad PD0 is electrically connected to a part to which the acceleration detecting resonator R1 and the temperature detecting resonator R2 are not electrically connected. For example, the aluminum pad PD0 is connected to ground potential.

The damping member 20 is disposed for controlling vibration characteristics of the weight 11. The damping member 20 is disposed near the weight 11 with the predetermined gap G. Specifically, the damping member 20 is made of material of which thermal expansion coefficient and elastic constant are similar to the acceleration detecting substrate 10. For example, the damping member 20 is made of silicon or glass. The damping member 20 is bonded to the fixed frame 13 on −Z side of the acceleration detecting substrate 10, so that the predetermined gap G can be formed between the weight 11 and the damping member 20.

The damping member 20 is disposed near the weight 11 with the predetermined gap G, so that the gap G can acts as a damper with respect to the weight 11 by a squeeze film effect. The damper effect can be adjusted by adjusting the size of the gap and the pressure of gas in the gap G. Therefore, by adjusting the size of the gap and the pressure of the gas in the gap G, a damping coefficient of the weight 11 can be adjusted. Therefore, the vibration characteristics of the weight 11 can be desired characteristics. The vibration characteristics of the weight 11 are usually adjusted to be Butterworth characteristics (flattest characteristics). The pressure of the gas in the gap G is set to be different from sealing pressure of the acceleration detecting resonator R1 which is vacuum-sealed.

As described above, the damping member 20 is made of the material of which thermal expansion coefficient and elastic constant are similar to the acceleration detecting substrate 10, and the damping member 20 is directly bonded to the fixed frame 13 of the acceleration detecting substrate 10. Therefore, temperature characteristics, hysteresis, and long term stability can be improved. The damping member 20 is also used as a mounting member for mounting the resonant sensor 1 on housing (package) which is not shown in the figures.

<Acceleration Detecting Resonator>

Figure 3:
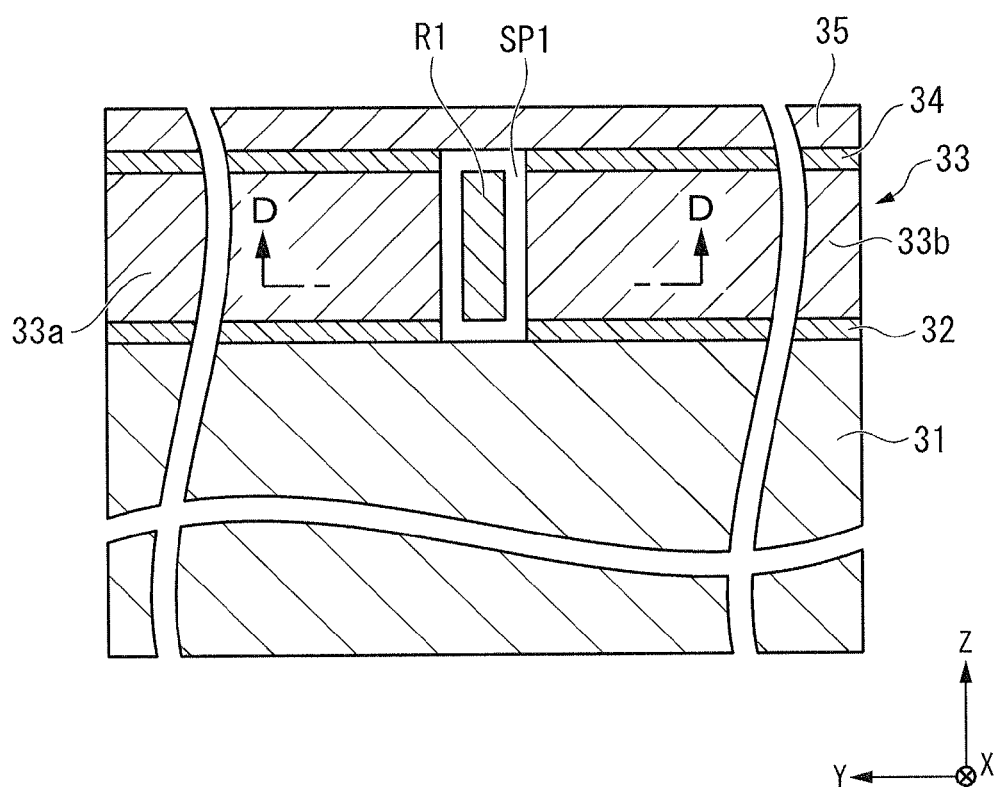
FIG. 3 is a sectional view on the line B-B shown in FIG. 1.
Figure 4:
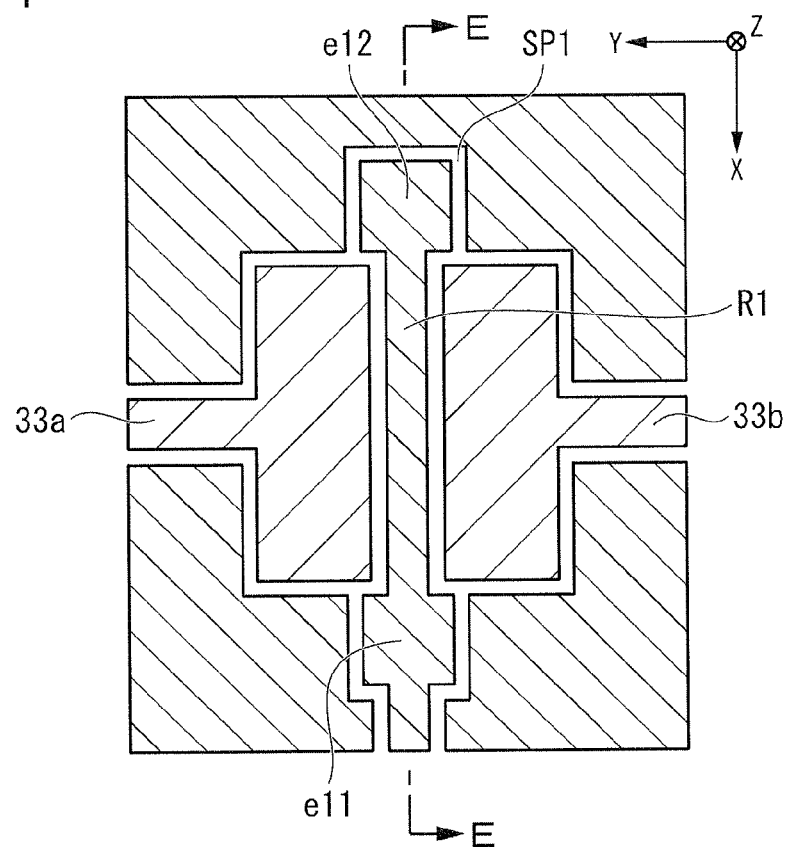
FIG. 4 is a sectional view on the line D-D shown in FIG. 3.
Figure 5:
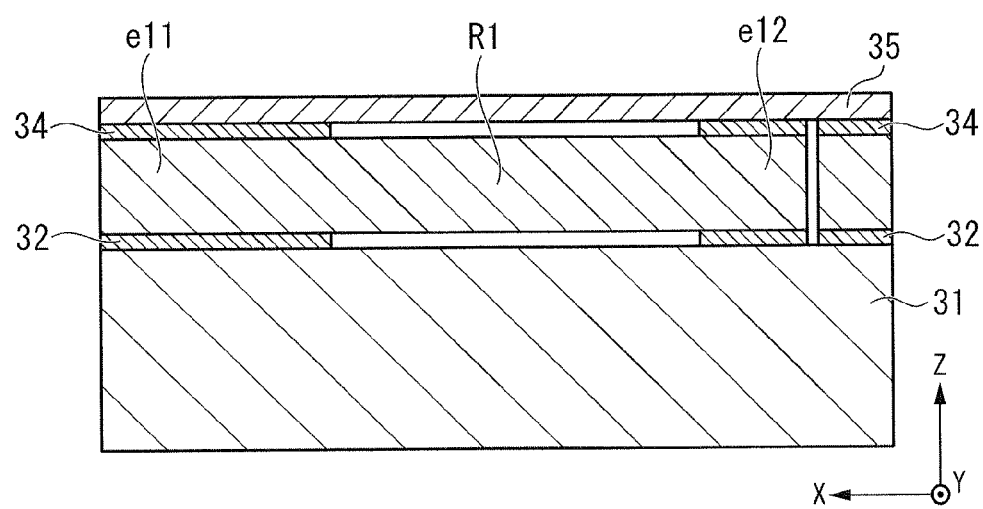
FIG. 5 is a sectional view on the line E-E shown in FIG. 4.

FIG. 3 to FIG. 5 are sectional views of the acceleration detecting resonator disposed in the resonant sensor in the first embodiment. Specifically, FIG. 3 is a sectional view on the line B-B shown in FIG. 1. FIG. 4 is a sectional view on the line D-D shown in FIG. 3. FIG. 5 is a sectional view on the line E-E shown in FIG. 4.

As shown in FIG. 3, in a part in which the acceleration detecting resonator R1 is disposed, a lower insulation film 32, electrodes 33 (an input electrode 33a and an output electrode 33b), an upper insulation film 34, and a shell 35 are formed in order on a substrate 31. The part, in which the acceleration detecting resonator R1 is disposed, is a front side (+Z side) of a part to which the spring 12 and the fixed frame 13 are connected. The acceleration detecting resonator R1 is disposed in a vacuum chamber SP1 formed by the substrate 31, the input electrode 33a, the output electrode 33b, the shell 35, and so on.

For example, the substrate 31 is a silicon substrate. The lower insulation film 32 and the upper insulation film 34 are, for example, silicon dioxide ($SiO_2$) so as to electrically insulate the input electrode 33a and the output electrode 33b. For example, the shell 35 is made of polysilicon. The shell 35 is disposed so as to seal the vacuum chamber SP1 in which the acceleration detecting resonator R1 is disposed.

The input electrode 33a is an electrode to which the exciting signal for vibrating the acceleration detecting resonator R1 is input. The output electrode 33b is an electrode for receiving the signal of which frequency is the same as the resonant frequency of the acceleration detecting resonator R1. The input electrode 33a and the output electrode 33b are disposed in the direction Y with the acceleration detecting resonator R1 interposed.

As shown in FIG. 4, the acceleration detecting resonator R1 is a beam extending along the direction X. As shown in FIG. 5, both ends e11 and e12 of the acceleration detecting resonator R1 are fixed on the substrate 31 and the shell 35 via the lower insulation film 32 and the upper insulation film 34. Specifically, at least a part of the acceleration detecting resonator R1 is disposed in the vacuum chamber SP1 formed in the spring 12. Also, the acceleration detecting resonator R1 is disposed in a state where the acceleration detecting resonator R1 has the tensile strain and the both ends e11 and e12 are fixed. Therefore, if the spring 12 is bended in the direction Z, the strain (the tensile strain and the compression strain) is applied to the acceleration detecting resonator R1. In a case that the tensile strain is applied, the resonant frequency of the acceleration detecting resonator R1 becomes higher. On the other hand, in a case that the compression strain is applied, the resonant frequency of the acceleration detecting resonator R1 becomes lower.

<Temperature Detecting Resonator>

Figure 6:
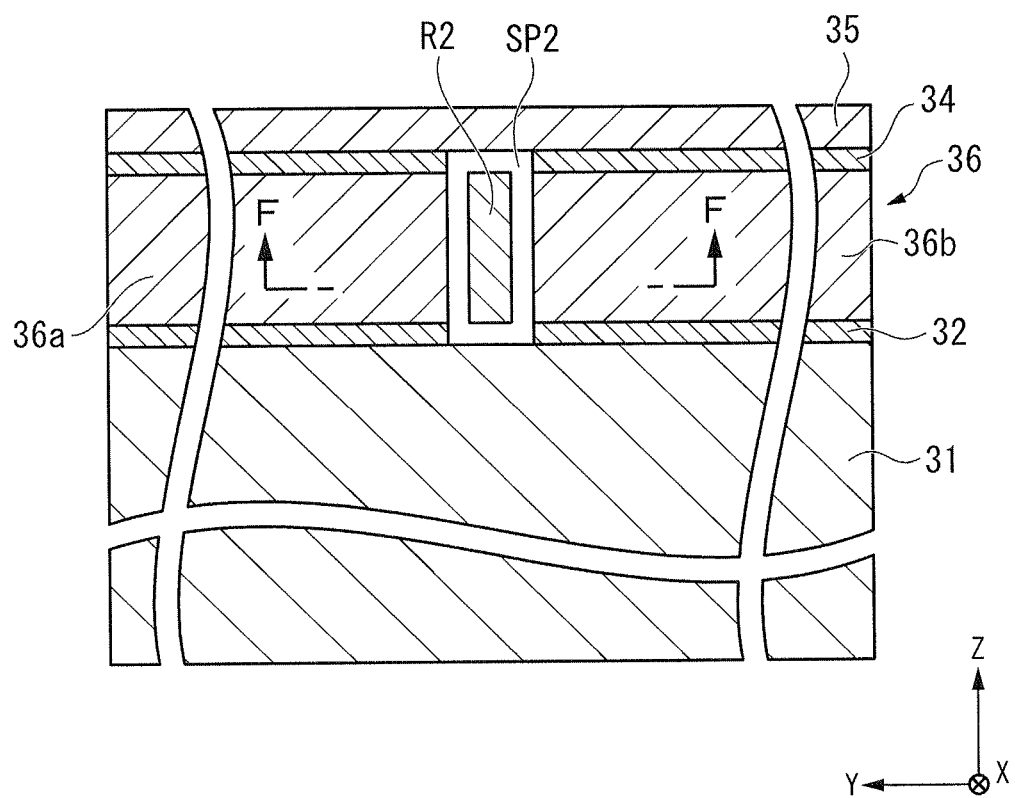
FIG. 6 is a sectional view on the line C-C shown in FIG. 1.
Figure 7:
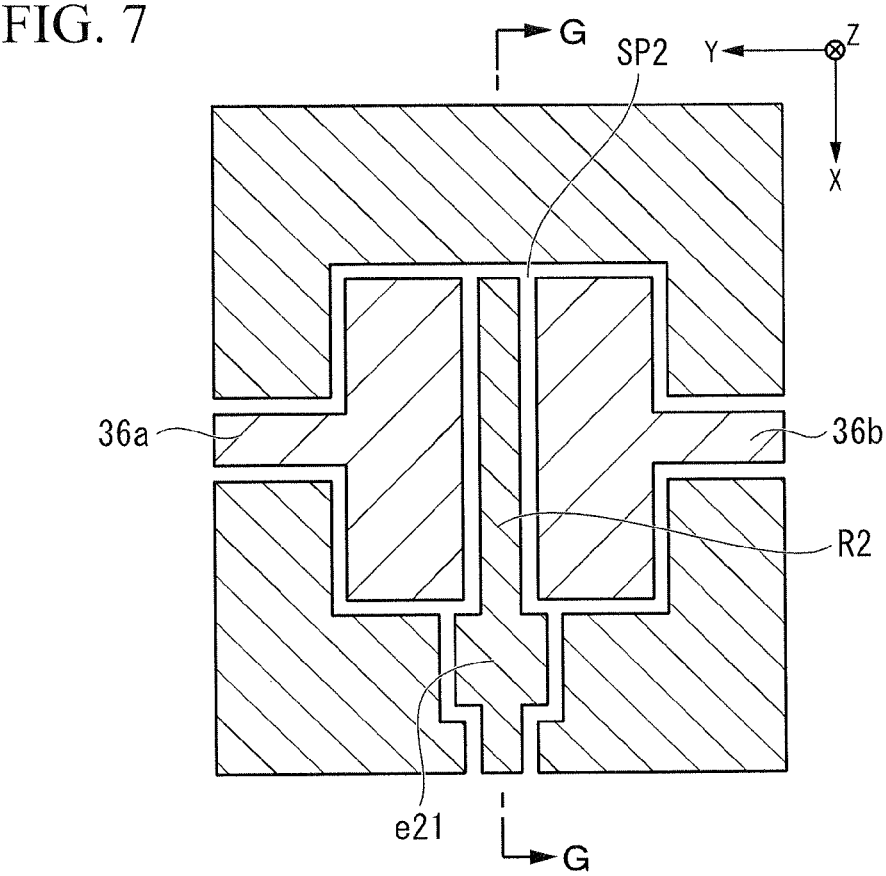
FIG. 7 is a sectional view on the line F-F shown in FIG. 6.
Figure 8:
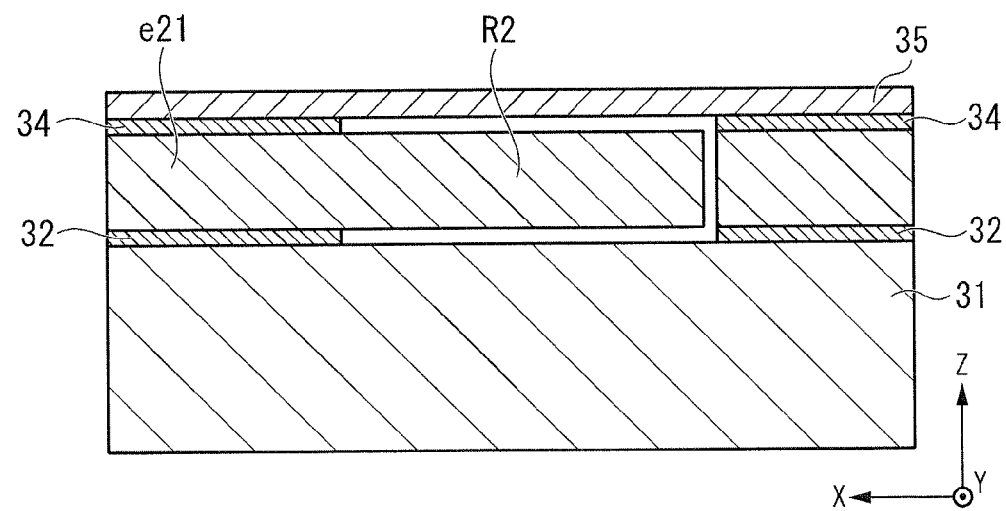
FIG. 8 is a sectional view on the line G-G shown in FIG. 7.

FIG. 6 to FIG. 8 are sectional views of the temperature detecting resonator disposed in the resonant sensor in the first embodiment. Specifically, FIG. 6 is a sectional view on the line C-C shown in FIG. 1. FIG. 7 is a sectional view on the line F-F shown in FIG. 6. FIG. 8 is a sectional view on the line G-G shown in FIG. 7.

As shown in FIG. 6, a part in which the temperature detecting resonator R2 is disposed has the same structure as the part in which the acceleration detecting resonator R1 is disposed. Specifically, electrodes 36 (an input electrode 36a and an output electrode 36b) are disposed instead of the electrodes 33 (an input electrode 33a and an output electrode 33b). Also, the lower insulation film 32, the electrodes 36 (an input electrode 36a and an output electrode 36b), the upper insulation film 34, and the shell 35 are formed in order on the substrate 31. The temperature detecting resonator R2 is disposed in a vacuum chamber SP2 formed by the substrate 31, the input electrode 36a, the output electrode 36b, the shell 35, and so on.

The input electrode 36a is an electrode to which the exciting signal for vibrating the temperature detecting resonator R2 is input. The output electrode 36b is an electrode for obtaining the signal of which frequency is the same as the resonant frequency of the temperature detecting resonator R2. As is the case with the input electrode 33a and the output electrode 33b, the input electrode 36a and the output electrode 36b are disposed in the direction Y with the temperature detecting resonator R2 interposed. An arrangement direction of the temperature detecting resonator R2 may be different from the arrangement direction shown in FIG. 6.

As shown in FIG. 7, the temperature detecting resonator R2 is a beam extending along the direction X. As shown in FIG. 8, one end e21 of the temperature detecting resonator R2 is fixed on the substrate 31 and the shell 35 via the lower insulation film 32 and the upper insulation film 34. Specifically, the temperature detecting resonator R2 is disposed in the vacuum chamber SP2 with only the one end 21 fixed so as not to be affected by the strain generated and by the acceleration acting on the resonant sensor 1 and mounting.

In the temperature detecting resonator R2, Young's modulus is changed and the resonant frequency is changed in accordance with the temperature in the resonant sensor 1 (temperature which is approximately the same as the temperature of the acceleration detecting resonator R1). Therefore, the temperature in the resonant sensor 1 can be calculated in accordance with the frequency of the signal obtained by the output electrode 36b. The calculated temperature in the resonant sensor 1 is used for correcting the detection result (resonant frequency) of the acceleration detecting resonator R1 by the temperature.

<Operations of Resonant Sensor>

Next, operations of the resonant sensor 1 will be simply described. If the acceleration in the direction −Z is applied to the resonant sensor 1, the weight 11 is relatively displaced in the direction +Z with respect to the fixed frame 13. Thereafter, the spring 12 is bended in accordance with the relative displacement between the weight 11 and the fixed frame 13. Thereby, the strain, which is proportional to the acceleration acting on the resonant sensor 1, is generated. The strain generated in the spring 12 is applied to the acceleration detecting resonator R1. Thereby, the resonant frequency of the acceleration detecting resonator R1 is changed.

Specifically, if the acceleration, which relatively displaces the weight 11 with respect to the fixed frame 13 in the direction −Z (positive input acceleration), is applied to the resonant sensor 1, the spring 12 is bended in the direction −Z in accordance with the displacement of the weight 11, and the tensile strain is generated on the upper surface (the surface on +Z side) of the spring 12. If the strain is applied to the acceleration detecting resonator R1, the resonant frequency of the acceleration detecting resonator R1 becomes higher.

On the other hand, if the acceleration, which relatively displaces the weight 11 with respect to the fixed frame 13 in the direction +Z (negative input acceleration), is applied to the resonant sensor 1, the spring 12 is bended in the direction +Z in accordance with the displacement of the weight 11, and the compression strain is generated on the upper surface (the surface on +Z side) of the spring 12. If the strain is applied to the acceleration detecting resonator R1, the resonant frequency of the acceleration detecting resonator R1 becomes lower. By detecting the change of the resonant frequency of the acceleration detecting resonator R1, the acceleration acting on the resonant sensor 1 can be measured.

Figure 9A:
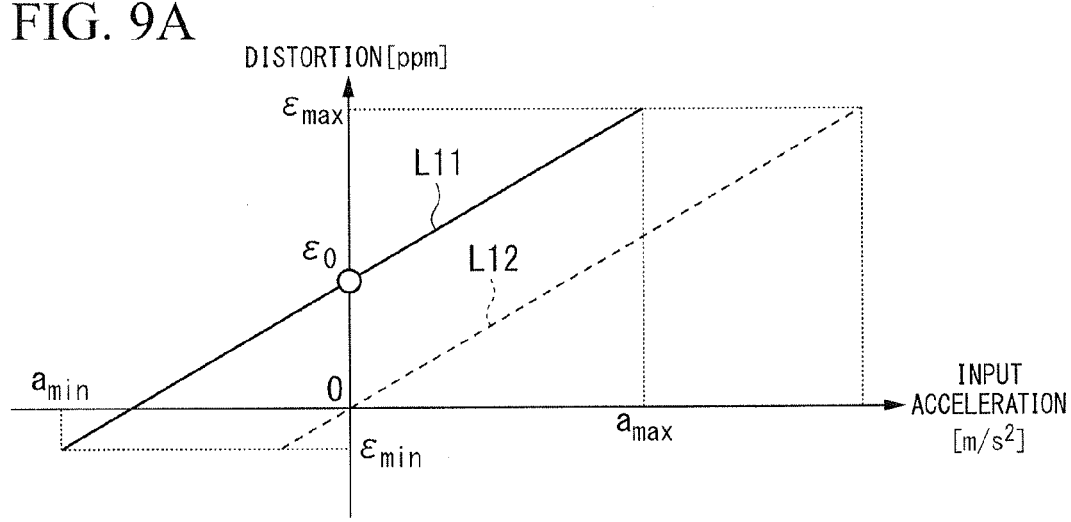
FIG. 9A is a drawing illustrating a relation between the input acceleration and the strain.
Figure 9B:
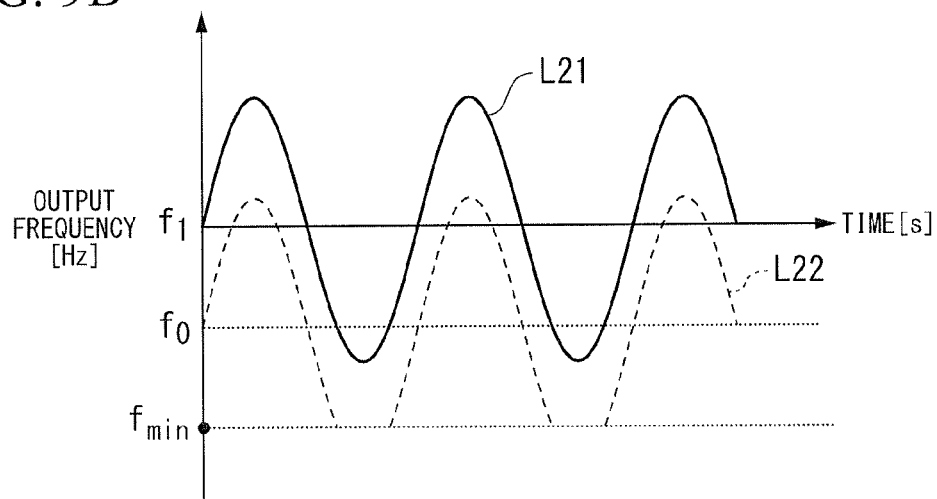
FIG. 9B is a drawing illustrating a time variation of the output frequency.
Figure 9C:
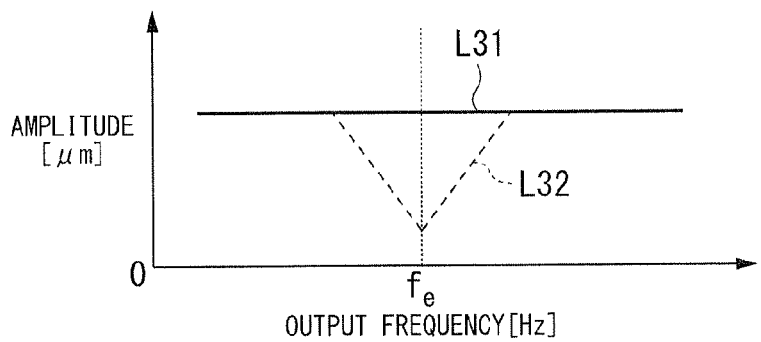
FIG. 9C is a drawing illustrating an example of frequency characteristics.

FIG. 9A to FIG. 9C are a drawing illustrating exemplary characteristics of the acceleration detecting resonator disposed in the resonant sensor in the first embodiment. FIG. 9A is a drawing illustrating a relation between the input acceleration and the strain. FIG. 9B is a drawing illustrating a time variation of the output frequency. FIG. 9C is a drawing illustrating an example of frequency characteristics. In FIG. 9A, the horizontal axis indicates the input acceleration, and the vertical axis indicates the strain applied to the acceleration detecting resonator R1. In the FIG. 9B, the horizontal axis indicates time, and the vertical axis indicates the frequency (output frequency) of the signal output from the output electrode 33b (referring to FIG. 3 and FIG. 4). In FIG. 9C, the horizontal axis indicates the output frequency, and the vertical axis indicates amplitude of the signal.

The value $\epsilon_{max}$ on the vertical axis shown in FIG. 9A indicates a value of the tensile strain at which the creep or the destruction of the acceleration detecting resonator R1 is generated. The value $\epsilon_{min}$ on the vertical axis shown in FIG. 9A indicates a value of compression strain at which the acceleration detecting resonator R1 is buckled. In a case that the acceleration detecting resonator R1 does not have the tensile strain (in other words, in a case of conventional one), if the input acceleration is zero, the strain is not generated in the acceleration detecting resonator R1. Therefore, the relation between the input acceleration and the strain is represented by a line L12 shown in the FIG. 9A. Referring to the line L12, it can be understood that although the allowable positive acceleration is large, the allowable negative acceleration is very small.

On the other hand, in a case that the acceleration detecting resonator R1 has the tensile strain, even if the input acceleration is zero, the tensile strain is generated. Therefore, the relation between the input acceleration and the strain is represented by a line L11 shown in the FIG. 9A. In FIG. 9A, the value of the tensile strain, when the input acceleration is zero, is represented by $\epsilon_0$. Referring to the line L11, comparing to the line L12, it can be understood that although the allowable positive acceleration is small, the allowable negative acceleration increases to $a_{min}$.

When the acceleration is sensed, the positive input acceleration and the negative input acceleration are often generated equally. Therefore, the dynamic range is generally defined by a smaller one between a maximum value (an absolute value) of the positive input acceleration and a maximum value (an absolute value) of the negative input acceleration. The line L11 shown in FIG. 9A is significantly larger in the maximum value of the negative input acceleration which can be measured than the line L12. Therefore, the acceleration detecting resonator R1 having the tensile strain is significantly wider in the dynamic range than the conventional one.

The frequency $f_{min}$ shown on the vertical axis of FIG. 9B is an output frequency when the compression strain ($\epsilon_{min}$ shown in FIG. 9A) which causes bucking is applied to the acceleration detecting resonator R1. In a case that the acceleration detecting resonator R1 does not have the tensile strain and the dynamic range is narrow (in other words, in a case of conventional one), a time variation of the output frequency is represented by the curve L22 shown in FIG. 9B. Referring to the curve L22, any frequency which is smaller than the frequency $f_{min}$ cannot be obtained. For the reason, it can be understood that, if a large negative input acceleration is applied to the resonant sensor 1, the acceleration cannot be measured.

On the other hand, in a case that the acceleration detecting resonator R1 has the tensile strain and the dynamic range is wide, a time variation of the output frequency is represented by the curve L 21 shown in FIG. 9B. Referring to the curve L21, even if a large negative input acceleration is applied to the resonant sensor 1, the output frequency is not less than the frequency $f_{min}$. For the reason, as shown in FIG. 9B, the output frequency which is changed in a sine-wave shape can be obtained. Thereby, the acceleration acting on the resonant sensor 1 can be accurately measured.

The frequency $f_c$ shown on the horizontal axis of FIG. 9C is a natural frequency of the spring 12. In a case that the vibration direction of the acceleration detecting resonator R1 is the same as the vibration direction of the spring 12 (in other words, in a case of conventional one), the frequency characteristics is represented by the curve L32 in FIG. 9C. Referring to the curve L32, it can be understood that, if the output frequency (resonant frequency of the acceleration detecting resonator R1) is the same as the natural frequency $f_e$ of the spring 12, the amplitude is decreased.

On the other hand, in a case that the vibration direction of the acceleration detecting resonator R1 is different from the vibration direction of the spring 12, the frequency characteristics is represented by the curve L31 in FIG. 9C. Referring to the curve L31, it can be understood that, even if the output frequency (resonant frequency of the acceleration detecting resonator R1) is the same as the natural frequency $f_e$ of the spring 12, the amplitude is not decreased. This is because the vibration direction of the acceleration detecting resonator R1 is set to be in the direction Y perpendicular to the direction Z which is the vibration direction of the spring 12, and the energy for vibrating the acceleration detecting resonator R1 is not absorbed by the spring 12. Thereby, even if the resonant frequency of the acceleration detecting resonator R1 is the same as the natural frequency $f_c$ of the spring 12, the acceleration can be measured with high accuracy.

<Manufacturing Method of Resonant Sensor>

Figure 10A:
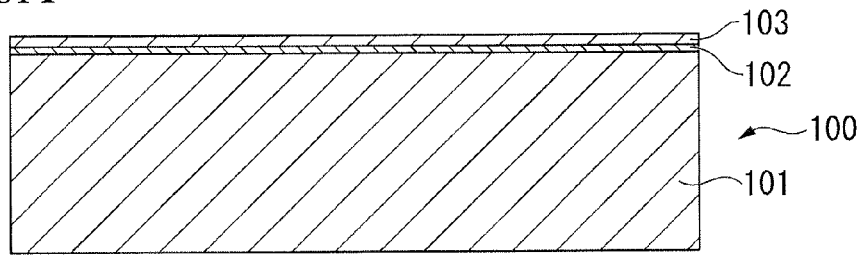
FIG. 10A is a process drawing illustrating a manufacturing method of the resonant sensor in the first embodiment.

FIG. 10A to FIG. 11B are process drawings illustrating a manufacturing method of the resonant sensor 1 in the first embodiment. As shown in FIG. 10A, so as to manufacture the resonant sensor 1, an SOI (Silicon on Insulator) substrate 100 is prepared. In the SOI substrate 100, a BOX (Buried Oxide) layer 102 and an active layer 103 are sequentially layered on a silicon substrate 101. For example, the BOX layer 102 is made of silicon dioxide ($SiO_2$). The active layer is made of single-crystal silicon. The silicon substrate 101 is a substrate 31 shown in FIG. 3, FIG. 5, FIG. 6, and FIG. 8. The BOX layer 102 is used as the lower insulation film 32 (referring to FIG. 3 and FIG. 5). The acceleration detecting resonator R1 and the temperature detecting resonator R2 is formed on the active layer 103.

Figure 10B:
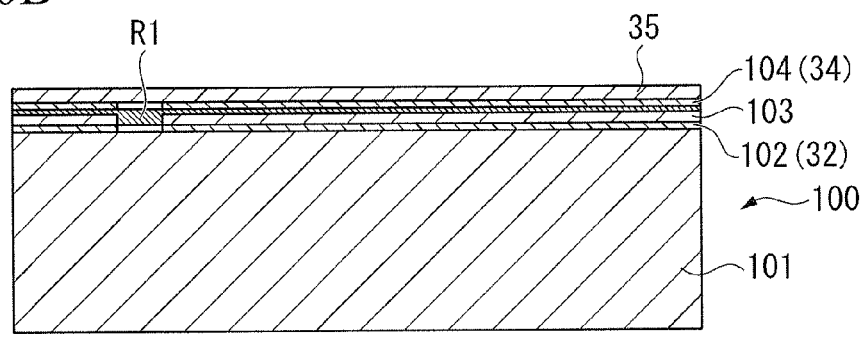
FIG. 10B is a process drawing illustrating a manufacturing method of the resonant sensor in the first embodiment.

When the manufacturing of the resonant sensor 1 is started, as shown in FIG. 10B, the acceleration detecting resonator R1 and structures associated therewith (the electrodes 33, the upper insulation film 34, and the shell 35 shown in FIG. 2) are formed. In this process, in addition to the acceleration detecting resonator R1, the temperature detecting resonator R2 and structures associated therewith (the electrodes 36, the upper insulation film 34, and the shell 35 shown in FIG. 6) are formed. However, in a following description, it will be described by focusing on the acceleration detecting resonator R1.

Figure 12A:
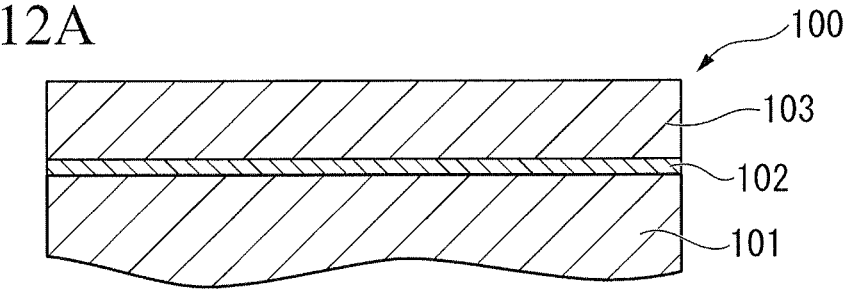
FIG. 12A is a process drawing illustrating a manufacturing method of the acceleration detecting resonator disposed in the resonant sensor in the first embodiment.

FIG. 12A to FIG. 15C are process drawings illustrating a manufacturing method of the acceleration detecting resonator disposed in the resonant sensor 1 in the first embodiment. When the manufacturing of the acceleration detecting resonator R1 is started, the surface of the SOI substrate 100 shown in FIG. 12A is etched. Thereby, the acceleration detecting resonator R1 and the electrodes 33 (the input electrode 33a and the output electrode 33b) are formed.

Figure 12B:
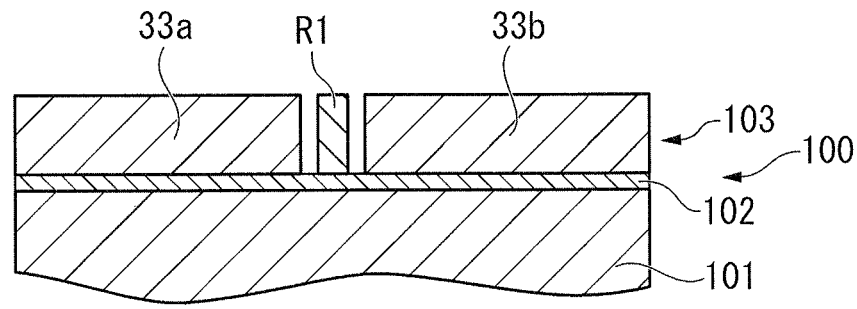
FIG. 12B is a process drawing illustrating a manufacturing method of the acceleration detecting resonator disposed in the resonant sensor in the first embodiment.

Specifically, as shown in FIG. 12B, for example, the active layer 103 is etched by using DeepRIE (Deep Reactive Ion Etching). Thereby, the acceleration detecting resonator R1, the input electrode 33a, and the output electrode 33b, which have the shape shown in FIG. 4, are formed. As shown in FIG. 12B, the acceleration detecting resonator R1 is formed so that a width of the acceleration detecting resonator R1 in a layered direction of the SOI substrate 100 is greater than a width of the acceleration detecting resonator R1 in an in-plane direction of the SOI substrate 100. Thereby, the acceleration detecting resonator R1 vibrates in the in-plane direction of the SOI substrate 100 (in the direction Y shown in FIG. 3).

Figure 12C:
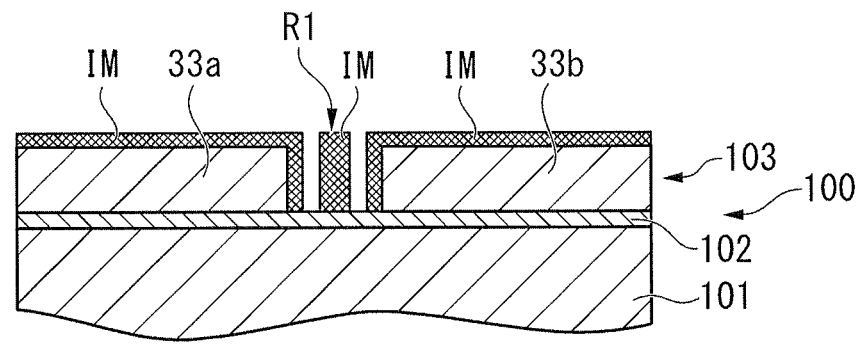
FIG. 12C is a process drawing illustrating a manufacturing method of the acceleration detecting resonator disposed in the resonant sensor in the first embodiment.

Next, as shown in FIG. 12C, impurities IM are diffused in the acceleration detecting resonator R1. Specifically, the impurities IM are diffused in the acceleration detecting resonator R1 by a heat diffusion method or a diffusion method of using PBF (Poly-Boron Film). The atomic radius of the impurity IM is smaller than the atomic radius of silicon of which the acceleration detecting resonator R1 is made. For example, the impurities IM are boron (B), phosphorus (P), or the like. The diffusion of the impurities IM is performed to an extent of 20th power of 10 [atom/cm$^2$] which is near a solid solubility limit of silicon. As shown in FIG. 12C, the impurities IM are diffused on the surfaces of the input electrode 33a and the output electrode 33b.

If the impurities IM are diffused in the acceleration detecting resonator R1, the impurities IM, of which atomic radius is smaller than the radius of silicon of the acceleration detecting resonator R1, replace the silicon. Therefore, force for compressing the acceleration detecting resonator R1 is generated. However, because the both ends of the acceleration detecting resonator R1 are fixed, the tensile strain acts on the acceleration detecting resonator R1. In this way, the acceleration detecting resonator R1 has the tensile strain.

Figure 12D:
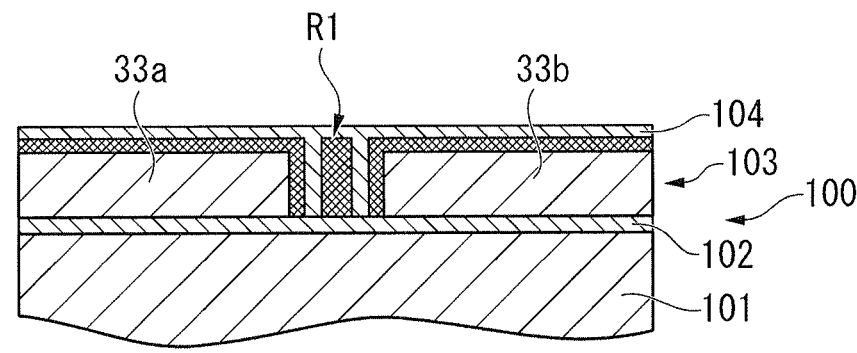
FIG. 12D is a process drawing illustrating a manufacturing method of the acceleration detecting resonator disposed in the resonant sensor in the first embodiment.

Next, as shown in FIG. 12D, an oxidized film 104, which covers the acceleration detecting resonator R1, the input electrode 33a, and the output electrode 33b, is formed. For example, the oxidized film 104 is formed by using a CVD (Chemical Vapor Deposition), a sputter, or the like. The oxidized film 104 is used as the upper insulation film 34 (referring to FIG. 3 and FIG. 5). The oxidized film 104 is also buried in a trench between the acceleration detecting resonator R1, the input electrode 33a, and the output electrode 33b.

Figure 13A:
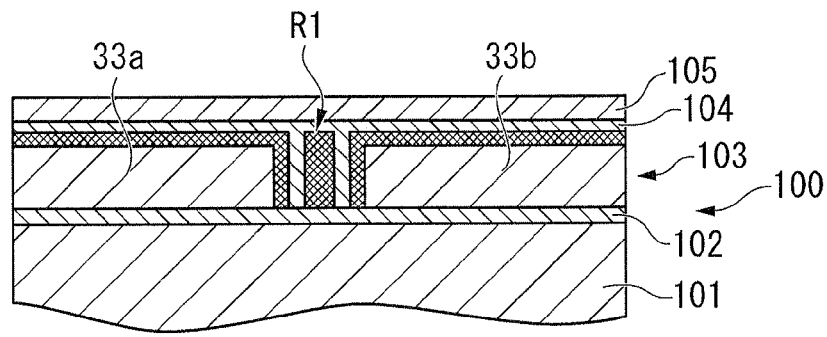
FIG. 13A is a process drawing illustrating a manufacturing method of the acceleration detecting resonator disposed in the resonant sensor in the first embodiment.
Figure 13B:
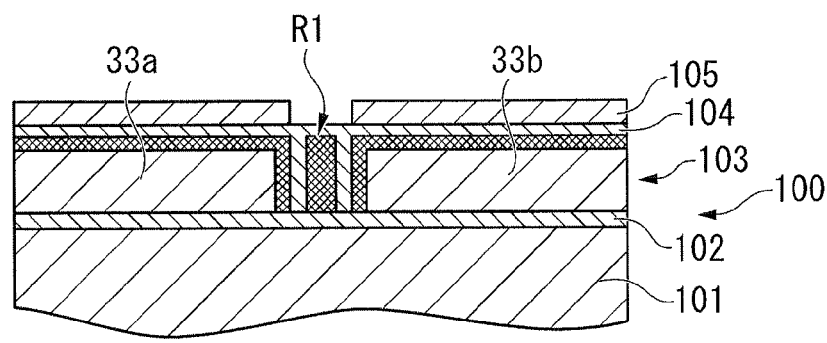
FIG. 13B is a process drawing illustrating a manufacturing method of the acceleration detecting resonator disposed in the resonant sensor in the first embodiment.
Figure 13C:
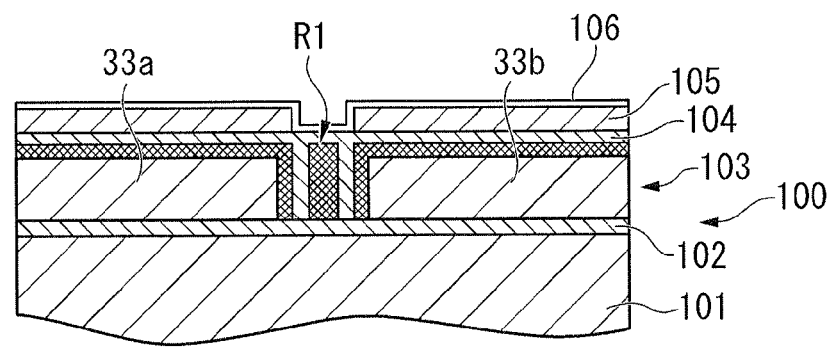
FIG. 13C is a process drawing illustrating a manufacturing method of the acceleration detecting resonator disposed in the resonant sensor in the first embodiment.
Figure 13D:
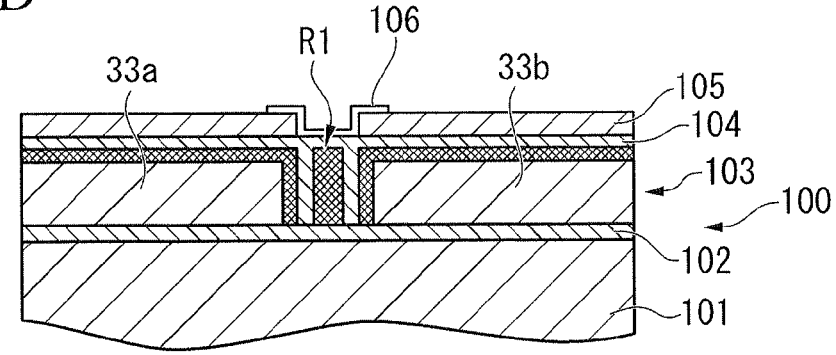
FIG. 13D is a process drawing illustrating a manufacturing method of the acceleration detecting resonator disposed in the resonant sensor in the first embodiment.

Next, as shown in FIG. 13A, a first polysilicon layer 105 is formed on the oxidized film 104. The first polysilicon layer 105 is a part of the shell 35. Thereafter, as shown in FIG. 13B, a part of the first polysilicon layer 105 (a part over the acceleration detecting resonator R1) is etched. Next, as shown in FIG. 13C, an oxidized film 106 covering the first polysilicon layer 105 is formed by the CVD. Thereafter, as shown in FIG. 13D, the oxidized film 106 is patterned so that the oxidized film 106 over the acceleration detecting resonator R1 remains.

Figure 14A:
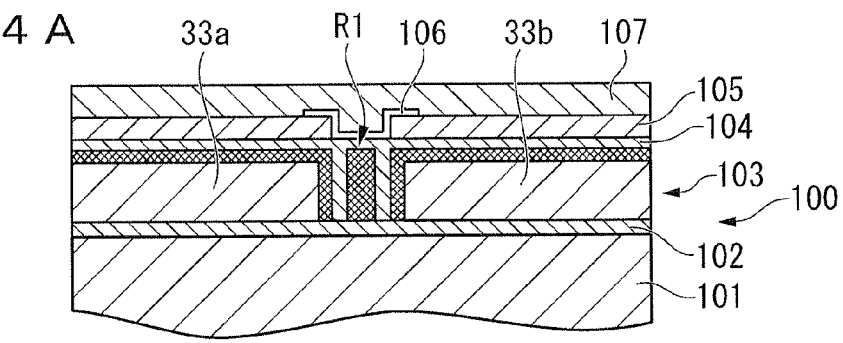
FIG. 14A is a process drawing illustrating a manufacturing method of the acceleration detecting resonator disposed in the resonant sensor in the first embodiment.
Figure 14B:
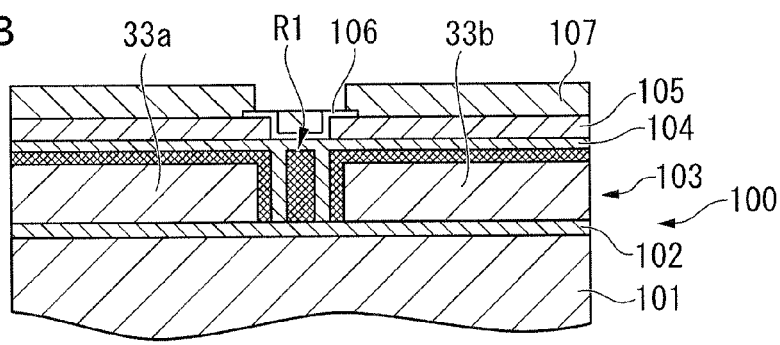
FIG. 14B is a process drawing illustrating a manufacturing method of the acceleration detecting resonator disposed in the resonant sensor in the first embodiment.

Next, as shown in FIG. 14A, a second polysilicon layer 107 covering the first polysilicon layer 105 and the oxidized film 106 is formed. The second polysilicon layer 107 is formed by using the CVD. However, a forming condition of the second polysilicon layer 107 is set to a condition for making a height of the surface of the second polysilicon layer 107 more uniform, even if a height difference exists in the oxidized film 106. Next, as shown in FIG. 14B, a part of the second polysilicon layer 107 (the part over the oxidized film 106) is etched to an extent of the height of the oxidized film 106 formed on the first polysilicon layer 105. Because the oxidized film 106 is to be etched in a next process, it is important that the oxidized film 106 formed on the first polysilicon layer 105 is exposed completely.

Figure 14C:
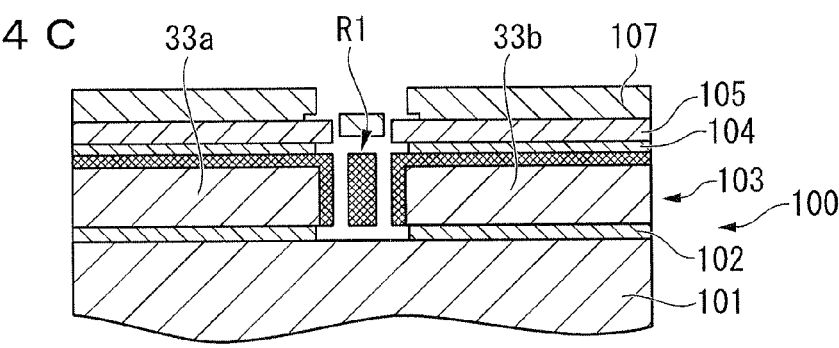
FIG. 14C is a process drawing illustrating a manufacturing method of the acceleration detecting resonator disposed in the resonant sensor in the first embodiment.

Next, as shown in FIG. 14C, the oxidized film 106, and the BOX layer 102 and the oxidized film 104 which are formed around the acceleration detecting resonator R1 are etched. By performing this process, the vacuum chamber SP1 shown in FIG. 2 is formed, only the both ends of the acceleration detecting resonator R1 (the both ends e11 and e12 shown in FIG. 4 and FIG. 5) are fixed, and side surfaces of the acceleration detecting resonator R1 are apart from the input electrode 33a and the output electrode 33b.

Figure 14D:
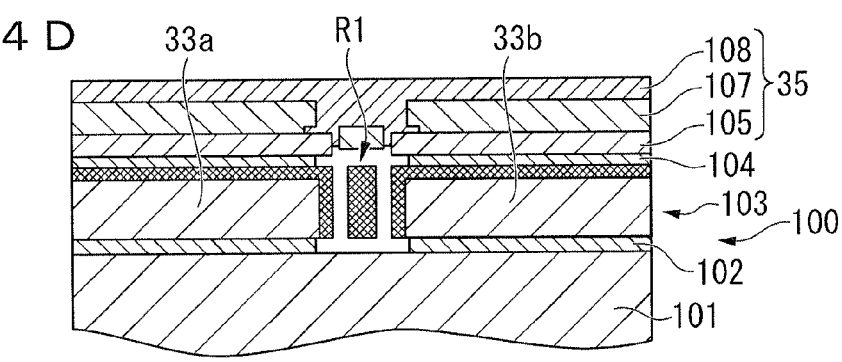
FIG. 14D is a process drawing illustrating a manufacturing method of the acceleration detecting resonator disposed in the resonant sensor in the first embodiment.

Next, as shown in FIG. 14D, a polysilicon layer 108 covering the first polysilicon layer 105 and the second polysilicon layer 107 is formed, and the vacuum chamber SP1 is sealed. In this process, by using a monosilane, the polysilicon layer 108 is grown epitaxially on the first polysilicon layer 105 and the second polysilicon layer 107. By performing the process, the shell having the first polysilicon layer 105, the second polysilicon layer 107, and the second polysilicon layer 108 is formed.

In the process, because hydrogen gas is generated when the polysilicon layer 108 is formed, the vacuum chamber SP1 is filled with the hydrogen gas. Therefore, after the process, anneal is performed with high temperature, and the hydrogen gas in the vacuum chamber SP1 is discharged to outside. By performing the process, high vacuum degree is kept in the vacuum chamber SP1. As the result, Q value of the acceleration detecting resonator R1 can be increased. In this way, the acceleration detecting resonator R1, which can easily detect the resonant frequency by using an external circuit, is formed.

Figure 15A:
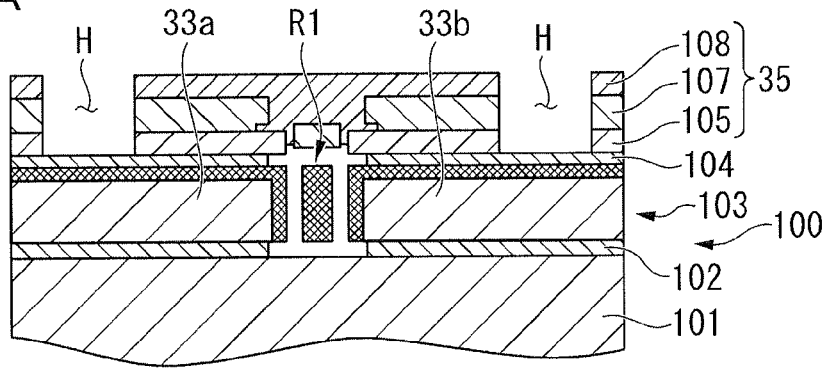
FIG. 15A is a process drawing illustrating a manufacturing method of the acceleration detecting resonator disposed in the resonant sensor in the first embodiment.

After these processes are ended, as shown in FIG. 15A, the shell 35 is partially etched and electrode outlet holes H are formed. This process is performed as a preceding process so as to form electrodes connected to the input electrode 33a and the output electrode 33b in a post process. Specifically, the oxidized film 104 is used as an etching stop. By partially etching the polysilicon layer 108, the second polysilicon layer 107, and the first polysilicon layer 105 which are included in the shell 35 formed over the input electrode 33a and the output electrode 33b, the electrode outlet holes H are formed.

In FIG. 15A, so as to understand easily, the electrode outlet holes H are shown near the acceleration detecting resonator R1. However, the electrode outlet holes H are formed at arbitrary positions suitable for mounting the sensor in a post process. For example, the electrode outlet holes H may be formed at positions where the aluminum pad PD1 shown in FIG. 1 is formed. In a case that the electrode outlet holes are formed in these positions, it is necessary for the input electrode 33a and the output electrode 33b to extend to under the positions where the aluminum pad PD1 is formed.

Figure 15B:
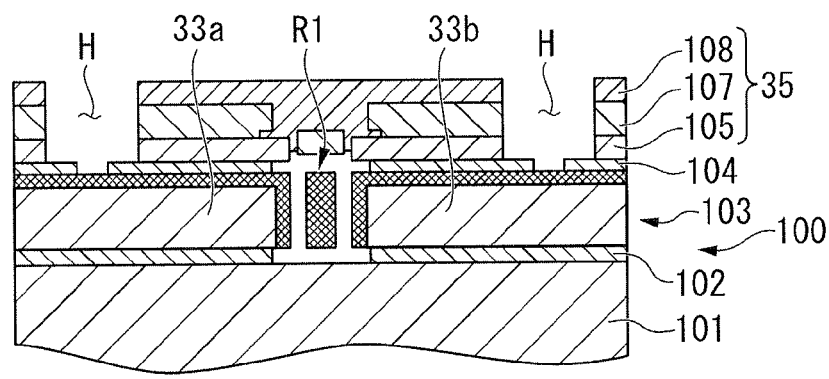
FIG. 15B is a process drawing illustrating a manufacturing method of the acceleration detecting resonator disposed in the resonant sensor in the first embodiment.
Figure 15C:
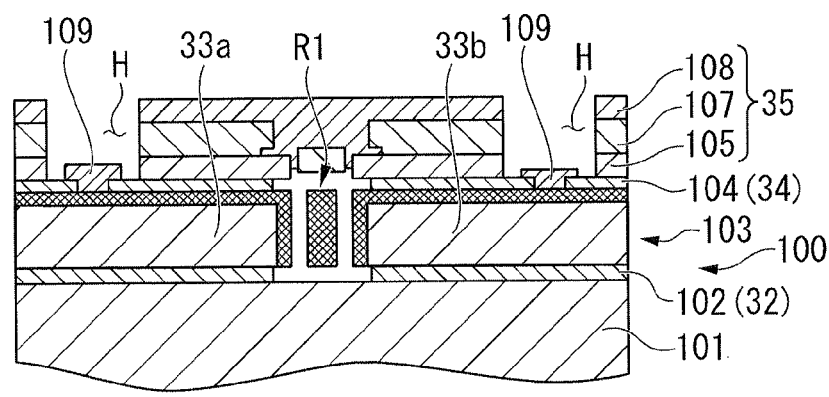
FIG. 15C is a process drawing illustrating a manufacturing method of the acceleration detecting resonator disposed in the resonant sensor in the first embodiment.

Next, as shown in FIG. 15B, the oxidized film 104 exposed in the electrode outlet holes H is etched. Thereafter, electrodes 109 are formed in the electrode outlet holes H. By performing these processes shown in FIG. 12A to FIG. 15C, the acceleration detecting resonator R1 and the structures associated therewith (the electrodes 33, the upper insulation film 34, and the shell 35 shown in FIG. 2) are formed.

Figure 10C:
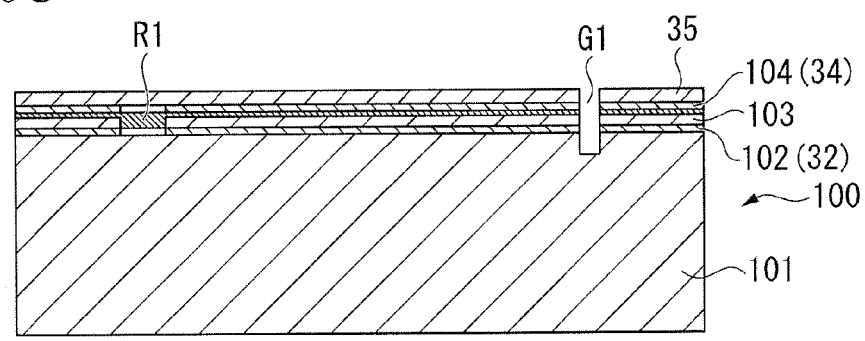
FIG. 10C is a process drawing illustrating a manufacturing method of the resonant sensor in the first embodiment.

After the acceleration detecting resonator R1 and the structures associated therewith are formed, as shown in FIG. 10C, a part of the gap G1 shown in FIG. 1 is formed. Specifically, the shell 35, the oxidized film 104 (the upper insulation film 34), the active layer 103, and the BOX layer 102 (the lower insulation film 32) are penetrated through by dry etching, wet etching, ion milling, field discharge processing, or the like, and a trench extending to a predetermined depth of the silicon substrate 101 is formed. The silicon substrate 101 is etched so that a position of the bottom of the trench is under a position of the bottom of the spring 12 shown in FIG. 2 (under the surface of the spring 12 of −Z side).

Figure 10D:
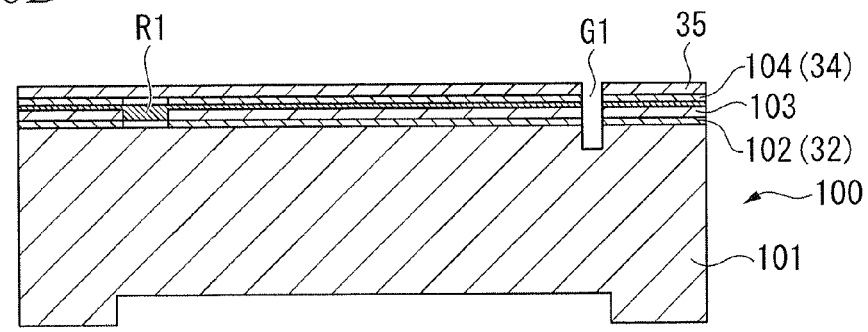
FIG. 10D is a process drawing illustrating a manufacturing method of the resonant sensor in the first embodiment.

Next, as shown in FIG. 10D, the back surface side of the silicon substrate 101 is etched. The process is a process for forming the gap G shown in FIG. 2 afterward. The silicon substrate 101 is etched so that a size of the gap G (depth of the etching) is larger than a size of the gap G1. The dry etching, the wet etching, or the like can be used as the etching method of the present process.

Figure 11A:
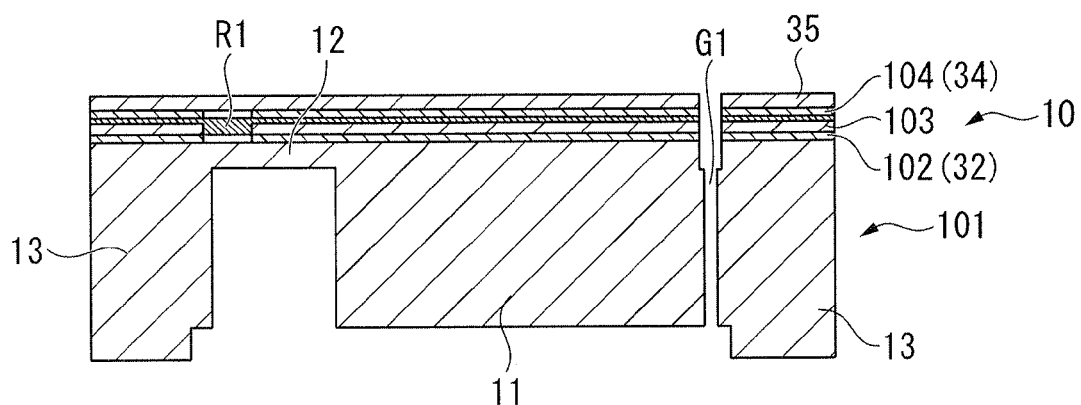
FIG. 11A is a process drawing illustrating a manufacturing method of the resonant sensor in the first embodiment.

Next, as shown in FIG. 11A, by etching the back surface side of the silicon substrate 101, the weight 11, the spring 12, and the fixed frame 13, and the gap G1 are formed. Specifically, a resist formed on the back surface side of the silicon substrate 101 is patterned so that the weight 11 and the fixed frame 13 are shaped as shown FIG. 1. Also, the back surface side of the silicon substrate 101 is etched so that the thickness of the spring becomes a predetermined thickness.

As described above, in the process shown in FIG. 10C, the trench (a part of the gap G1), of which bottom position is under the bottom position of the spring 12, is formed on a front surface side of the silicon substrate 101. Therefore, if the back surface side of the silicon substrate 101 is etched so that the thickness of the spring becomes the predetermined thickness, the gap G1 is formed completely. The dry etching, the wet etching, or the like can be used as the etching method of the present process. By these processes described above, the acceleration detecting substrate 10 is manufactured.

Figure 11B:
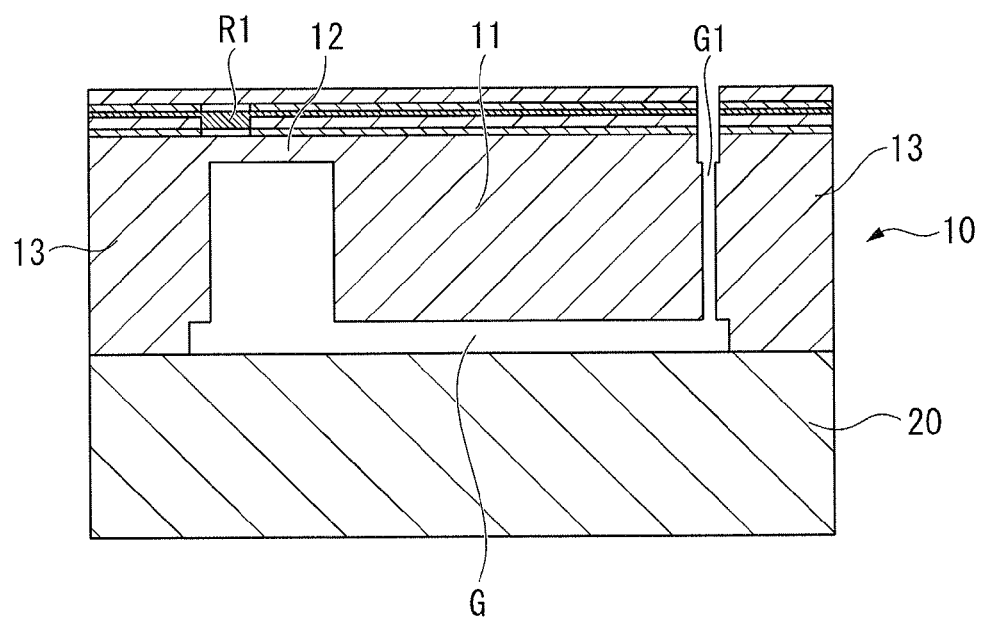
FIG. 11B is a process drawing illustrating a manufacturing method of the resonant sensor in the first embodiment.

Finally, as shown in FIG. 11B, the damping member 20 is bonded to the back surface side of the acceleration detecting substrate 10 manufactured by these processes (the back surface side of the fixed frame 13). As a bonding method of the damping member 20, so as to improve the temperature characteristics and the hysteresis, direct bonding, metal diffusion bonding, anode bonding, or the like (bonding method without using adhesive) can be used. Thereby, the resonant sensor 1 in the present embodiment is manufactured.

As described above, in the present embodiment, the spring extending in the direction X supports the weight 11 so that the weight 11 can relatively move in the direction Z with respect to the fixed frame 13. The acceleration detecting resonator R1 has the tensile strain which is in the direction X. At least a part of the acceleration detecting resonator R1 vibrating in the direction Y is embedded in the spring 12. For the reason, even if the negative input acceleration (input acceleration generating the compression strain in the acceleration detecting resonator R1) acts on the resonant sensor 1, the acceleration detecting resonator R1 is hardly buckled. Thereby, the dynamic range of the resonant sensor 1 can be expanded. In the present embodiment, the vibration direction of the acceleration detecting resonator R1 is set to be the direction Y perpendicular to the direction Z which is the vibration direction of the spring 12. For the reason, the energy for vibrating the acceleration detecting resonator R1 is not absorbed by the spring 12. Therefore, even if the resonant frequency of the acceleration detecting resonator R1 is the same as the natural frequency of the spring 12, the acceleration can be measured with high accuracy.

Second Embodiment

Figure 16A:
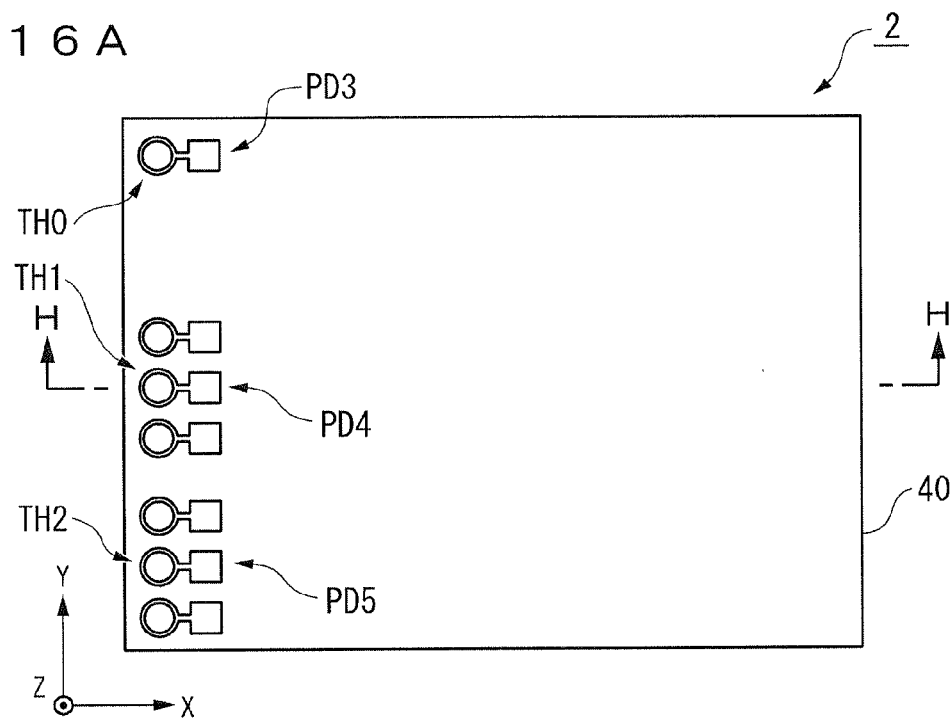
FIG. 16A is a plan view of the resonant sensor in the second embodiment.
Figure 16B:
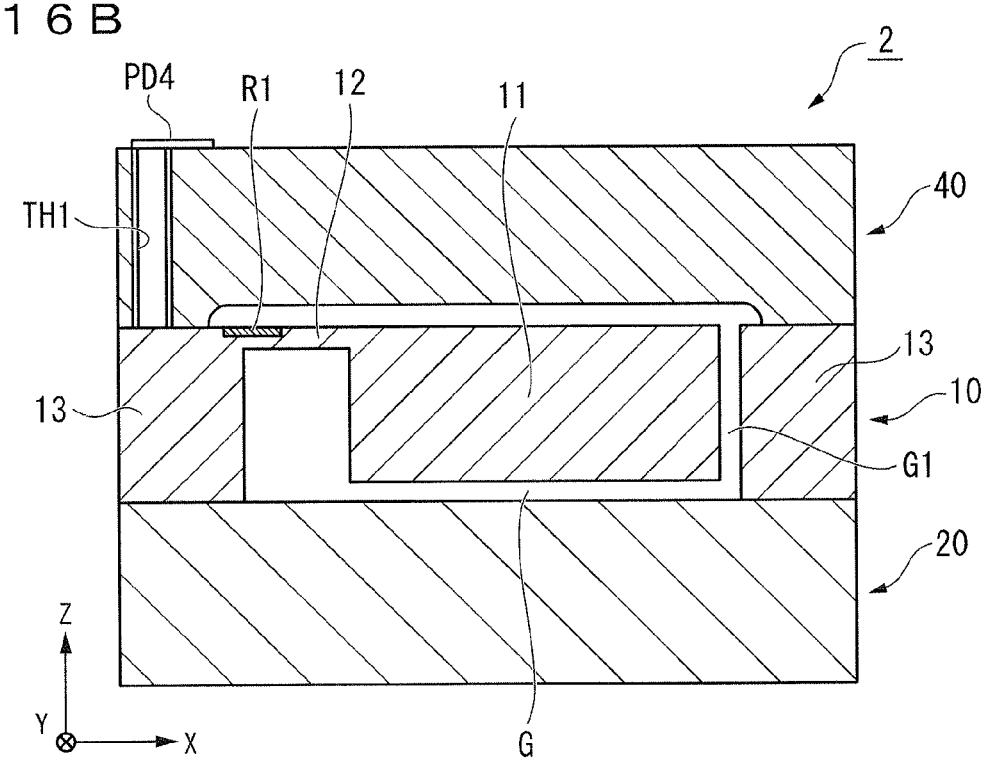
FIG. 16B is a sectional view on the line H-H shown in FIG. 16A.

FIG. 16A and FIG. 16B are drawings illustrating the resonant sensor in the second embodiment. FIG. 16A is a plan view of the resonant sensor in the second embodiment. FIG. 16B is a sectional view on the line H-H shown in FIG. 16A. In FIG. 16A and FIG. 16B, parts that correspond to those in FIG. 1 and FIG. 2 are assigned the same reference numerals. As shown in FIGS. 16A and 16B, in the resonant sensor 2 in the present embodiment, a sealing member 40 is disposed in the resonant sensor 1 shown in FIG. 1. Also, the weight 11, the spring 12, the acceleration detecting resonator R1, and so on are sealed by the sealing member 40.

As is the case with the damping member 20, the sealing member 40 is made of material (for example, silicon or glass) of which thermal expansion coefficient and elastic constant are similar to the acceleration detecting substrate 10. The sealing member 40 is bonded to the fixed frame 13 at +Z side of the acceleration detecting substrate 10. The bottom of the sealing member 40 is etched so as not to touch the weight 11 movable in the direction Z and the spring 12 bending in the direction Z in accordance with the displace of the weight 11.

Through holes TH0 to TH2 and aluminum pads PD3 to PD5 are formed on −X side of the sealing member 40. The through holes TH0 to TH2 are formed at positions associated with positions (positions in plan view) where the aluminum pads PD3 to PD5 are formed. The through holes TH0 to TH2 are also formed from the front surface side to the back surface side. Metallic layers made of aluminum or the like are formed by thin coating on inside walls of the through holes TH0 to TH2.

The aluminum pads PD3 to PD5 are formed on the front surface (surface on +Z side) of the sealing member 40. The aluminum pads PD3 to PD5 are connected to the through holes TH0 to TH2 respectively. The aluminum pads PD3 to PD5 are connected to the aluminum pads PD0 to PD2 respectively via the through holes TH0 to TH2. The aluminum pads PD3 to PD5 are used as external electrodes of the aluminum pads PD0 to PD2 which are sealed by the sealing member 40.

By disposing the sealing member 40, the gap G is sealed along with the weight 11, the spring 12, and the acceleration detecting resonator R1. Therefore, by adjusting pressure of gas in the gap G, the vibration characteristics of the weight 11 can be easily adjusted to desired characteristics. Because the resonant sensor 2 in the present embodiment only has the sealing member 40 in the resonant sensor 1 shown in FIG. 1, as is the case with the first embodiment, the dynamic range of the resonant sensor 1 can be expanded more than the conventional one, and the acceleration can be measured with high accuracy.

Third Embodiment

Figure 17:
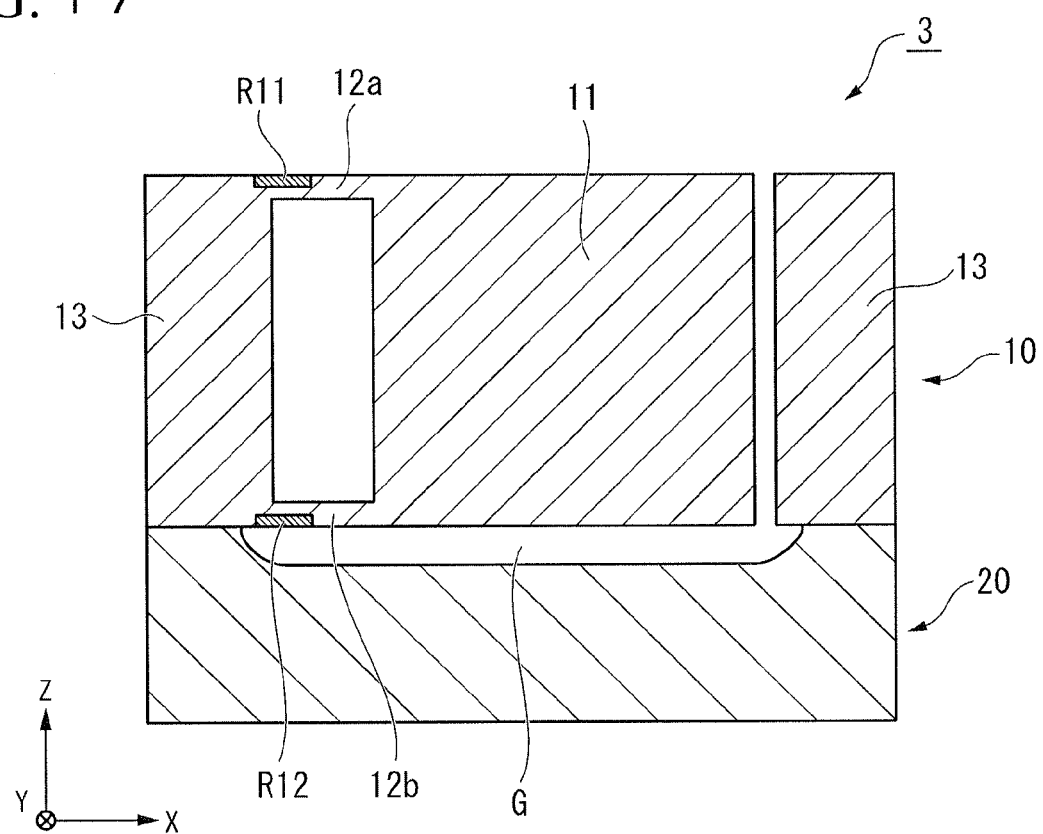
FIG. 17 is a sectional view of the resonant sensor in the third embodiment.

FIG. 17 is a sectional view of the resonant sensor in the third embodiment. In FIG. 17, parts that correspond to those in FIG. 1 and FIG. 2 are also assigned the same reference numerals. As shown in FIG. 17, in the resonant sensor 3 in the present embodiment, two springs 12a and 12b connecting the weight 11 and the fixed frame 13 are aligned in a row in the direction Z. Also, acceleration detecting resonators R11 and R12 are respectively embedded in the two springs 12a and 12b.

As is the case with the spring 12 shown in FIG. 2, at −X side of the weight 11, the spring 12a is connected to the upper end (+Z side end) of the weight 11 and the upper end of the fixed frame 13. On the other hand, at −X side of the weight 11, the spring 12b is connected to the lower end (−Z side end) of the weight 11 and the lower end of the fixed frame 13. In other words, the weight 11 is supported so that the weight 11 can relatively move in the direction Z with respect to the fixed frame 13, and the upper end and the lower end at −X side are respectively supported by the springs 12a and 12b.

The acceleration detecting resonators R11 and R12 are the same as the acceleration detecting resonator R1 shown in FIG. 1 and FIG. 2. At least a part of the acceleration detecting resonators R11 and R12 is embedded in the springs 12a and 12b. The acceleration detecting resonator R11 is disposed on the upper surface side (surface of +Z side) of the spring 12a. On the other hand, the acceleration detecting resonator R12 is disposed on the bottom surface side (surface of −Z side) of the spring 12b. It is necessary for the resonant sensor 3 in the present embodiment to support the lower end of the weight 11 by the spring 12b. Therefore, the bottom surface of the weight 11 is not etched, the upper surface of the damping member 20 is etched, and the gap G is formed.

Next, an operation of the resonant sensor 3 will be described simply. If the acceleration is applied to the resonant sensor 3 and the weight 11 is displaced in the direction +Z, the springs 12a and 12b are bended in the direction +Z. Thereby, the compression strain is applied to the acceleration detecting resonator R11, and the tensile strain is applied to the acceleration detecting resonator R12. On the other hand, if the acceleration is applied to the resonant sensor 3 and the weight 11 is displaced in the direction −Z, the springs 12a and 12b are bended in the direction −Z. Thereby, the tensile strain is applied to the acceleration detecting resonator R11, and the compression strain is applied to the acceleration detecting resonator R12.

In this way, in the resonant sensor 3 in the present embodiment, strain (tensile strain or compression strain), which is different from the strain (compression strain or tensile strain) applied to one of the acceleration detecting resonators R11 and R12, is applied to the other one. Therefore, common mode noise can be removed by calculating a difference between the resonant frequency detected by the acceleration detecting resonator R11 and the resonant frequency detected by the acceleration detecting resonator R12. Also, influence of disturbance (for example, static pressure and temperature), which is applied to the acceleration detecting resonators R11 and R12, can be removed.

As is the case with the acceleration detecting resonator R1 the acceleration detecting resonators R11 and R12 preliminarily have the tensile strain which is in the direction X, and the acceleration detecting resonators R11 and R12 are designed so as to vibrate in the direction Y. Therefore, as is the case with the first embodiment, in the resonant sensor 3 in the present embodiment, the dynamic range of the resonant sensor 3 can be expanded more than the conventional one, and the acceleration can be measured with high accuracy.

Fourth Embodiment

Figure 18:
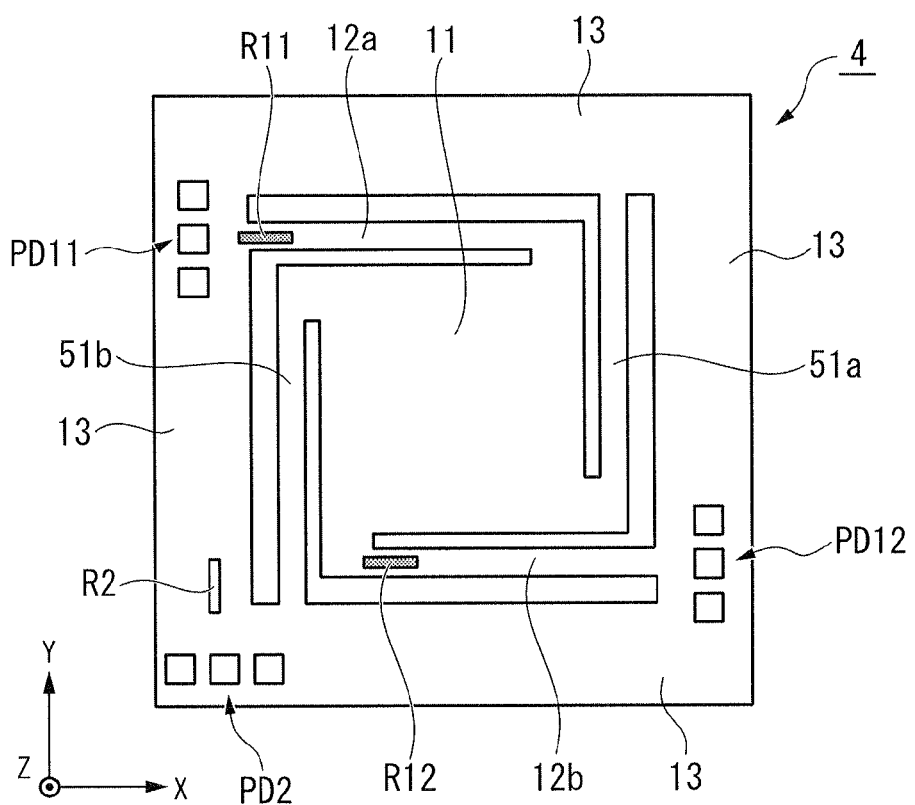
FIG. 18 is a plan view of the resonant sensor in the fourth embodiment.

FIG. 18 is a plan view of the resonant sensor in the fourth embodiment. In FIG. 18, parts that correspond to those in FIG. 1 and FIG. 2 are also assigned the same reference numerals. As shown in FIG. 18, in the resonant sensor 4 in the present embodiment, two springs 12a and 12b connecting the weight 11 and the fixed frame 13 are aligned in a row in the direction Y, and two auxiliary springs 51a and 51b (auxiliary supporter) connecting the weight 11 and the fixed frame 13 are aligned in a row in the direction X. Also, acceleration detecting resonators R11 and R12 are respectively embedded in the two springs 12a and 12b.

The spring 12a is formed so as to extend in the direction X. The spring 12a is connected to a corner of the weight 11 (a corner positioned in the direction +X and the direction +Y with respect to the center of the weight 11) and the fixed frame 13 positioned at −X side of the weight 11 and extending in the direction Y. On the other hand, the spring 12b is formed so as to extend in the direction X. The spring 12b is connected to a corner of the weight 11 (a corner positioned in the direction −X and the direction −Y with respect to the center of the weight 11) and the fixed frame 13 positioned at +X side of the weight 11 and extending in the direction Y.

The auxiliary spring 51a is formed so as to extend in the direction Y. The auxiliary spring 51a is connected to a corner of the weight 11 (a corner positioned in the direction +X and the direction −Y with respect to the center of the weight 11) and the fixed frame 13 positioned at +Y side of the weight 11 and extending in the direction X. On the other hand, the auxiliary spring 51b is formed so as to extend in the direction Y. The auxiliary spring 51b is connected to a corner of the weight 11 (a corner positioned in the direction −X and the direction +Y with respect to the center of the weight 11)

and the fixed frame 13 positioned at −Y side of the weight 11 and extending in the direction X.

The auxiliary springs 51a and 51b are disposed so as to suppress a rotational motion of the weight 11 (a rotational motion around the X axis, a rotational motion around the Y axis, and a rotational motion around the Z axis). In this way, in the present embodiment, four corners of the weight 11 are respectively supported by the springs 12a and 12b, and the auxiliary springs 51a and 51b. Thereby, the weight 11 can relatively move in the direction Z with respect to the fixed frame 13.

The acceleration detecting resonators R11 and R12 are the same as the acceleration detecting resonator R1 shown in FIG. 1 and FIG. 2. At least a part of the acceleration detecting resonators R11 and R12 is embedded in the front surface side (surface of +Z side) of the springs 12a and 12b. In the example shown in FIG. 18, the acceleration detecting resonators R11 is disposed near a connecting point between the spring 12a and the fixed frame 13. On the other hand, the acceleration detecting resonators R12 is disposed near a connecting point between the spring 12b and the weight 11. Aluminum pads PD11 and PD12, which are the same as the aluminum pad PD1 shown in FIG. 1, are disposed in correspondence to the acceleration detecting resonators R11 and R12 respectively.

Next, an operation of the resonant sensor 4 will be described simply. If the acceleration is applied to the resonant sensor 4 and the weight 11 is displaced in the direction +Z, all of the springs 12a and 12b and the auxiliary springs 51a and 51b are bended in the direction +Z. Thereby, the compression strain is applied to the acceleration detecting resonator R11 which is disposed near the connecting point between the spring 12a and the fixed frame 13, and the tensile strain is applied to the acceleration detecting resonator R12 which is disposed near the connecting point between the spring 12b and the weight 11.

On the other hand, if the acceleration is applied to the resonant sensor 4 and the weight 11 is displaced in the direction −Z, all of the springs 12a and 12b and the auxiliary springs 51a and 51b are bended in the direction −Z. Thereby, the tensile strain is applied to the acceleration detecting resonator R11 which is disposed near the connecting point between the spring 12a and the fixed frame 13, and the compression strain is applied to the acceleration detecting resonator R12 which is disposed near the connecting point between the spring 12b and the weight 11.

In this way, in the resonant sensor 4 in the present embodiment, as is the case with the third embodiment, strain (tensile strain or compression strain), which is different from the strain (compression strain or tensile strain) applied to one of the acceleration detecting resonators R11 and R12, is applied to the other one. Therefore, common mode noise can be removed, and influence of disturbance (for example, static pressure and temperature) can be removed. In the resonant sensor 4 in the present embodiment, because the springs 12a and 12b connected to the acceleration detecting resonators R11 and R12 can be made longer, sensitivity of the resonant sensor 4 can be improved.

As is the case with the acceleration detecting resonator R1, the acceleration detecting resonators R11 and R12 preliminarily have the tensile strain which is in the direction X, and the acceleration detecting resonators R11 and R12 are designed so as to vibrate in the direction Y. Therefore, as is the case with the first embodiment, in the resonant sensor 4 in the present embodiment, the dynamic range of the resonant sensor 4 can be expanded more than the conventional one, and the acceleration can be measured with high accuracy.

Fifth Embodiment

Figure 19:
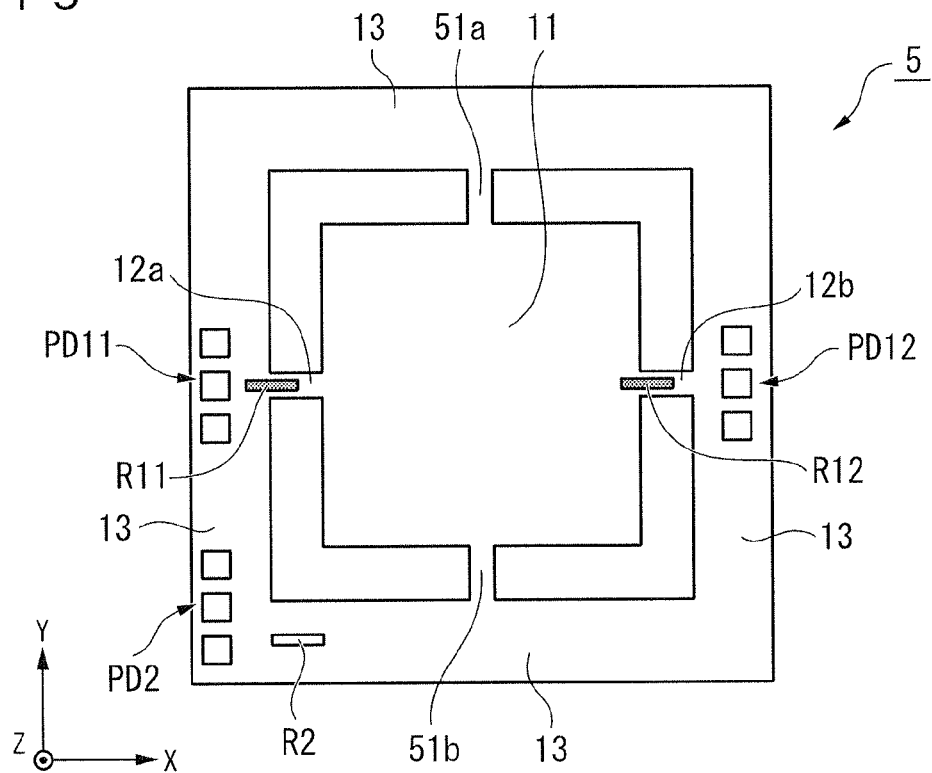
FIG. 19 is a plan view of the resonant sensor in the fifth embodiment.

FIG. 19 is a plan view of the resonant sensor in the fifth embodiment. In FIG. 19, parts that correspond to those in FIG. 1, FIG. 2, and FIG. 18 are also assigned the same reference numerals. As shown in FIG. 19, in the resonant sensor 5 in the present embodiment, two springs 12a and 12b connecting the weight 11 and the fixed frame 13 are disposed in a line extending in the direction X, and two auxiliary springs 51a and 51b (auxiliary supporter) connecting the weight 11 and the fixed frame 13 are disposed in a line extending in the direction Y. Also, acceleration detecting resonators R11 and R12 are respectively embedded in the two springs 12a and 12b.

The spring 12a is formed so as to extend in the direction X. The spring 12a is connected to −X side of the weight 11 and the fixed frame 13 positioned at −X side with respect to the weight 11. On the other hand, the spring 12b is formed so as to extend in the direction X. The spring 12b is connected to +X side of the weight 11 and the fixed frame 13 positioned at +X side with respect to the weight 11. The auxiliary spring 51a is formed so as to extend in the direction Y. The auxiliary spring 51a is connected to +Y side of the weight 11 and the fixed frame 13 positioned at +Y side with respect to the weight 11. On the other hand, the auxiliary spring 51b is formed so as to extend in the direction Y. The auxiliary spring 51b is connected to −Y side of the weight 11 and the fixed frame 13 positioned at −Y side with respect to the weight 11. In this way, in the present embodiment, four sides of the weight 11 are respectively supported by the springs 12a and 12b, and the auxiliary springs 51a and 51b. Thereby, the weight 11 can relatively move in the direction Z with respect to the fixed frame 13.

The acceleration detecting resonators R11 and R12 are the same as the acceleration detecting resonator R1 shown in FIG. 1 and FIG. 2. At least a part of the acceleration detecting resonators R11 and R12 is disposed in the front surface side (surface of +Z side) of the springs 12a and 12b. In the example shown in FIG. 19, as is the case with FIG. 18, the acceleration detecting resonators R11 is disposed near a connecting point between the spring 12a and the fixed frame 13. On the other hand, the acceleration detecting resonators R12 is disposed near a connecting point between the spring 12b and the weight 11.

In the resonant sensor 5 in the present embodiment, as is the case with the resonant sensor 4 in the fourth embodiment, strain (tensile strain or compression strain), which is different from the strain (compression strain or tensile strain) applied to one of the acceleration detecting resonators R11 and R12, is applied to the other one. Therefore, common mode noise can be removed, and influence of disturbance (for example, static pressure and temperature) can be removed.

As is the case with the acceleration detecting resonator R1, the acceleration detecting resonators R11 and R12 preliminarily have the tensile strain which is in the direction X, and the acceleration detecting resonators R11 and R12 are designed so as to vibrate in the direction Y. Therefore, as is the case with the first embodiment, in the resonant sensor 5 in the present embodiment, the dynamic range of the resonant sensor 5 can be expanded more than the conventional one, and the acceleration can be measured with high accuracy.

Sixth Embodiment

Figure 20:
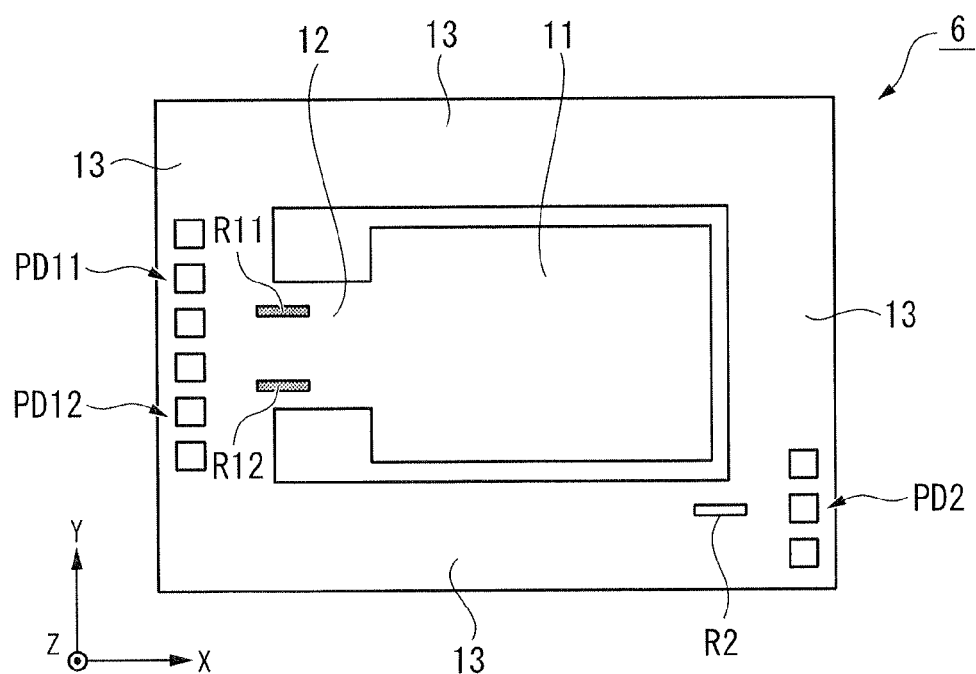
FIG. 20 is a plan view of the resonant sensor in the sixth embodiment.

FIG. 20 is a plan view of the resonant sensor in the sixth embodiment. In FIG. 20, parts that correspond to those in FIG. 1, FIG. 2, FIG. 18, and FIG. 19 are also assigned the same reference numerals. As shown in FIG. 20, the resonant sensor 6 in the present embodiment has acceleration detecting resonators R11 and R12 embedded in the spring 12 supporting the weight 11 in the resonant sensor 1 shown in FIG. 1. Specifically, the acceleration detecting resonators R11 and R12 are disposed near a connecting point between the spring 12 and the fixed frame 13, and the acceleration detecting resonators R11 and R12 are aligned in a row in the direction Y perpendicular to the direction X in which the spring 12 extends.

In the resonant sensor 6 in the present embodiment, the acceleration detecting resonators R11 and R12 are disposed near the connecting point between the spring 12 and the fixed frame 13. Therefore, if the spring 12 is bended in the direction +Z or the direction −Z, the same strain is applied to the both of the acceleration detecting resonators R11 and R12. However, if torsion around the X axis is generated in the spring 12, strain (tensile strain or compression strain), which is different from the strain (compression strain or tensile strain) applied to one of the acceleration detecting resonators R11 and R12, is applied to the other one. Therefore, influence of the torsion of the spring 12 can be removed by calculating the sum of the resonant frequency detected by the acceleration detecting resonators R11 and the resonant frequency detected by the acceleration detecting resonators R12.

As is the case with the acceleration detecting resonator R1, the acceleration detecting resonators R11 and R12 preliminarily have the tensile strain which is in the direction X, and the acceleration detecting resonators R11 and R12 are designed so as to vibrate in the direction Y. Therefore, as is the case with the first embodiment, in the resonant sensor 6 in the present embodiment, the dynamic range of the resonant sensor 6 can be expanded more than the conventional one, and the acceleration can be measured with high accuracy.

Seventh Embodiment

Figure 21A:
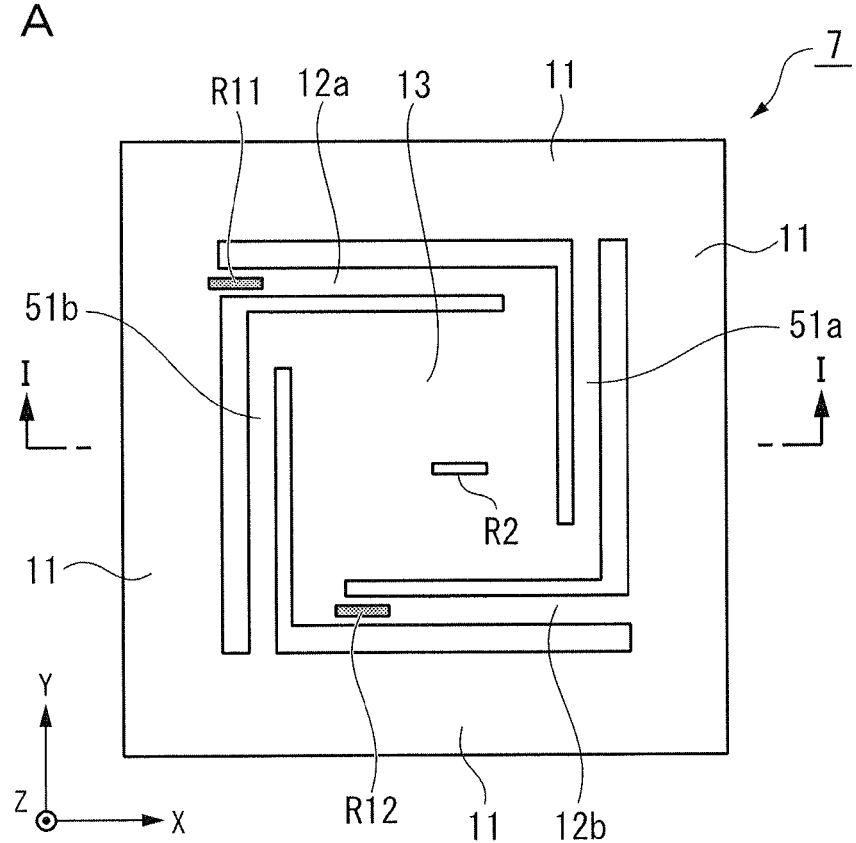
FIG. 21A is a plan view of the resonant sensor in the seventh embodiment.
Figure 21B:
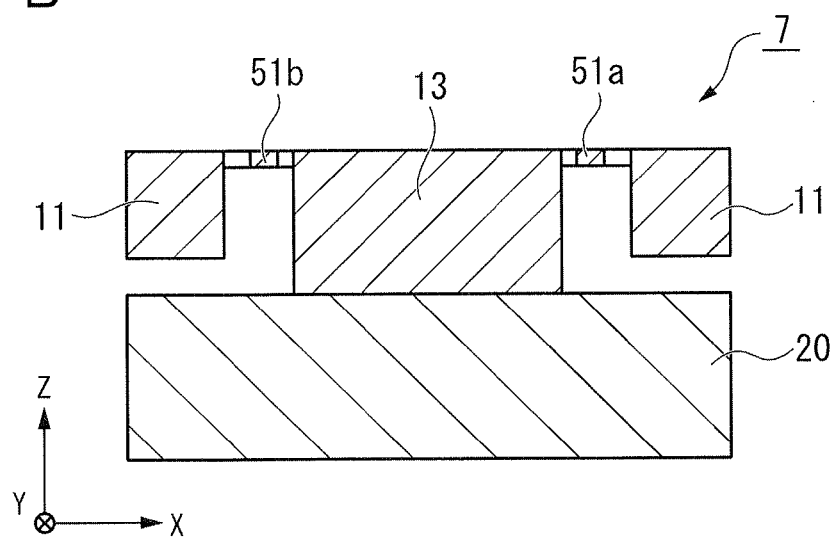
FIG. 21B is a sectional view on the line I-I shown in FIG. 21A.

FIG. 21A and FIG. 21B are drawings illustrating the resonant sensor in the seventh embodiment. FIG. 21A is a plan view of the resonant sensor in the seventh embodiment. FIG. 21B is a sectional view on the line I-I shown in FIG. 21A. In FIG. 21A and FIG. 21B, parts that correspond to those in FIG. 18 are assigned the same reference numerals. Also, in FIG. 21A and FIG. 21B, the aluminum pads PD11, PD12, and PD2 shown in FIG. 18 are omitted.

As shown in FIG. 21A and FIG. 21B, in the resonant sensor 7 in the present embodiment, the position relation of the weight 11 and the fixed frame 13 is changed. Specifically, the weight 11 is formed to be rectangular and annular so as to surround the fixed frame 13 in the XY plane. As is the case with the resonant sensor 4 shown in FIG. 18, the weight 11 is supported by the springs 12a and 12b, and the auxiliary springs 51a and 51b.

Specifically, the spring 12a is formed so as to extend in the direction X. The spring 12a is connected to a corner of the fixed frame 13 (a corner positioned in the direction +X and the direction +Y with respect to the center of the fixed frame 13) and the weight 11 positioned at −X side of the fixed frame 13 and extending in the direction Y. On the other hand, the spring 12b is formed so as to extend in the direction X. The spring 12b is connected to a corner of the fixed frame 13 (a corner positioned in the direction −X and the direction −Y with respect to the center of the fixed frame 13) and the weight 11 positioned at +X side of the fixed frame 13 and extending in the direction Y.

The auxiliary spring 51a is formed so as to extend in the direction Y. The auxiliary spring 51a is connected to a corner of the fixed frame 13 (a corner positioned in the direction +X and the direction −Y with respect to the center of the fixed frame 13) and the weight 11 positioned at +Y side of the fixed frame 13 and extending in the direction X. On the other hand, the auxiliary spring 51b is formed so as to extend in the direction Y. The auxiliary spring 51b is connected to a corner of the fixed frame 13 (a corner positioned in the direction −X and the direction +Y with respect to the center of the fixed frame 13) and the weight 11 positioned at −Y side of the fixed frame 13 and extending in the direction X.

The acceleration detecting resonator R11 is disposed near a connecting point between the spring 12a and the weight 11. On the other hand, the acceleration detecting resonators R12 is disposed near a connecting point between the spring 12b and the fixed frame 13. Therefore, as is the case with the fourth embodiment, common mode noise can be removed, influence of disturbance (for example, static pressure and temperature) can be removed, and sensitivity of the resonant sensor 7 can be improved.

As is the case with the acceleration detecting resonator R1, the acceleration detecting resonators R11 and R12 preliminarily have the tensile strain which is in the direction X, and the acceleration detecting resonators R11 and R12 are designed so as to vibrate in the direction Y. Therefore, as is the case with the first embodiment, in the resonant sensor 7 in the present embodiment, the dynamic range of the resonant sensor 7 can be expanded more than the conventional one, and the acceleration can be measured with high accuracy.

Eighth Embodiment

Figure 22A:
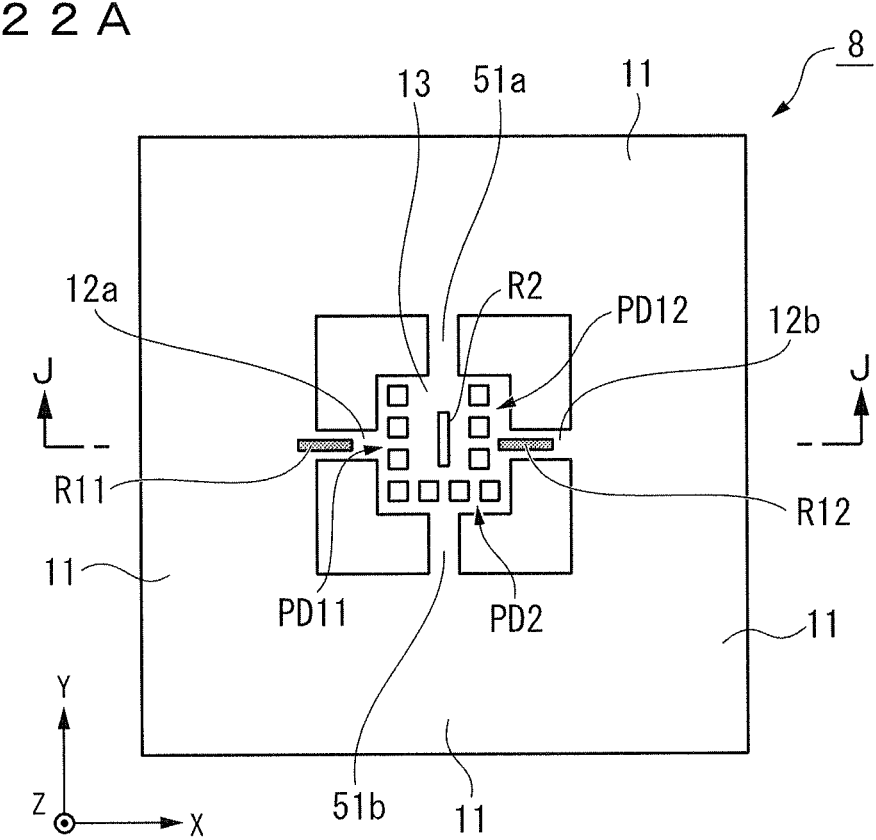
FIG. 22A is a plan view of the resonant sensor in the eighth embodiment.
Figure 22B:
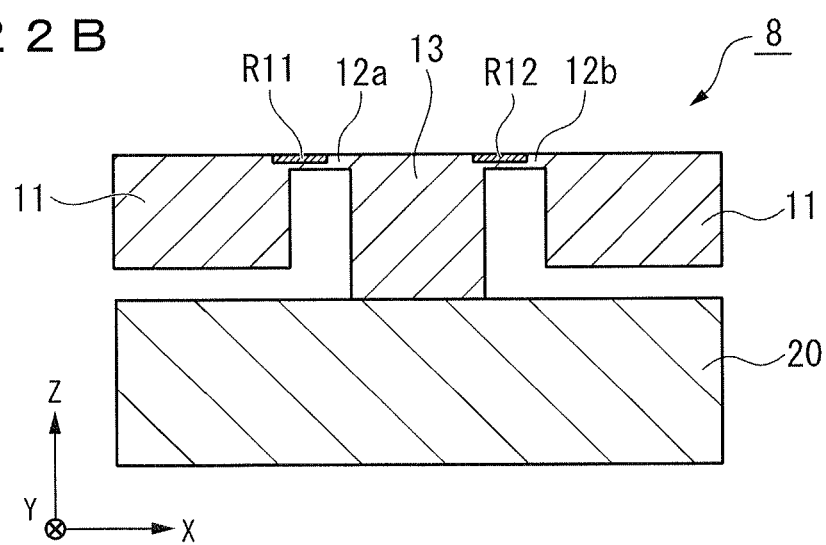
FIG. 22B is a sectional view on the line J-J shown in FIG. 22A.

FIG. 22A and FIG. 22B are drawings illustrating the resonant sensor in the eighth embodiment. FIG. 22A is a plan view of the resonant sensor in the eighth embodiment. FIG. 22B is a sectional view on the line J-J shown in FIG. 22A. In FIG. 22A and FIG. 22B, parts that correspond to those in FIG. 19 are assigned the same reference numerals. As shown in FIG. 22A and FIG. 22B, in the resonant sensor 8 in the present embodiment, as is the case with the resonant sensor 7 shown in FIG. 21A and FIG. 21B, the position relation of the weight 11 and the fixed frame 13 is changed. Specifically, the weight 11 is formed to be rectangular and annular so as to surround the fixed frame 13 in the XY plane. As is the case with the resonant sensor 5 shown in FIG. 19, the weight 11 is supported by the springs 12a and 12b, and the auxiliary springs 51a and 51b.

Specifically, the spring 12a is formed so as to extend in the direction X. The spring 12a is connected to −X side of the fixed frame 13 and the weight 11 positioned at −X side with respect to the fixed frame 13. On the other hand, the spring 12b is formed so as to extend in the direction X. The spring 12b is connected to +X side of the fixed frame 13 and the weight 11 positioned at +X side with respect to the fixed frame 13. The auxiliary spring 51a is formed so as to extend in the direction Y. The auxiliary spring 51a is connected to +Y side of the fixed frame 13 and the weight 11 positioned at +Y side with respect to the fixed frame 13. On the other hand, the auxiliary spring 51b is connected to −Y side of the fixed frame 13 and the weight 11 positioned at −Y side with respect to the fixed frame 13.

The acceleration detecting resonators R11 is disposed near a connecting point between the spring 12a and the weight 11. The acceleration detecting resonators R12 is disposed near a connecting point between the spring 12b and the fixed frame 13. Therefore, as is the case with the resonant sensor 7 in the seventh embodiment, in the resonant sensor 8 in the present embodiment, common mode noise can be removed, and influence of disturbance (for example, static pressure and temperature) can be removed.

As is the case with the acceleration detecting resonator R1, the acceleration detecting resonators R11 and R12 preliminarily have the tensile strain which is in the direction X, and the acceleration detecting resonators R11 and R12 are designed so as to vibrate in the direction Y. Therefore, as is the case with the first embodiment, in the resonant sensor 8 in the present embodiment, the dynamic range of the resonant sensor 8 can be expanded more than the conventional one, and the acceleration can be measured with high accuracy.

Ninth Embodiment

Figure 23:
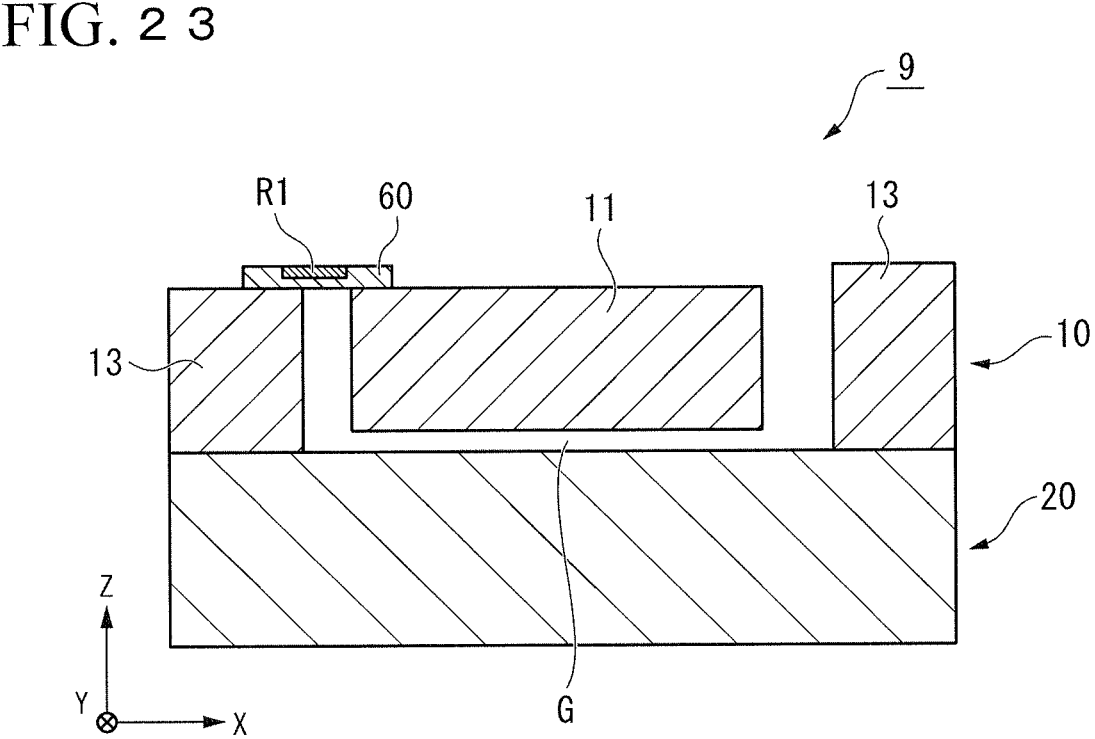
FIG. 23 is a sectional view of the resonant sensor in the ninth embodiment.

FIG. 23 is a sectional view of the resonant sensor in the ninth embodiment. In FIG. 23, parts that correspond to those in FIG. 1 and FIG. 2 are also assigned the same reference numerals. As shown in FIG. 23, in the resonant sensor 9 in the present embodiment, a spring substrate 60 (supporting member), in which the acceleration detecting resonator R1 is disposed, is bonded to the weight 11 and the fixed frame 13, so that the weight 11 is supported to be movable in the direction Z. The spring substrate 60 has the same thickness as the spring 12 shown in FIG. 1 and FIG. 2. For example, the spring substrate 60 is a substrate made of silicon.

In the resonant sensor 9, the tensile strain is preliminarily applied in the direction X to the acceleration detecting resonator R1 embedded in the spring substrate 60, and the acceleration detecting resonator R1 is designed so as to vibrate in the direction Y. Therefore, as is the case with the first embodiment, in the resonant sensor 9 in the present embodiment, the dynamic range of the resonant sensor 9 can be expanded more than the conventional one, and the acceleration can be measured with high accuracy.

Although a resonant sensor according to embodiments of the present invention has been described above, the present invention is not restricted to the above-described embodiments, and can be freely modified within the scope thereof. For example, the foregoing descriptions of the embodiments have been examples in which the acceleration detecting resonators R1, R11, and R12 preliminarily have the tensile strain which is in the direction X, and the acceleration detecting resonators R1, R11, and R12 are designed so as to vibrate in the direction Y. However, although the acceleration detecting resonators R1, R11, and R12 preliminarily have the tensile strain which is in the direction X, the acceleration detecting resonators R1, R11, and R12 may be designed so as to vibrate in a direction which is different from the direction Y. Also, the acceleration detecting resonators R1, R11, and R12 may be designed so as to vibrate in the direction Y, and the acceleration detecting resonators R1, R11, and R12 may not have the tensile strain which is in the direction X.

As used herein, the following directional terms "front, back, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A resonant sensor comprising:
   a mover that is movable in a first direction;
   a supporter that extends in a second direction perpendicular to the first direction, the supporter being connected to the mover and a fixer, the supporter supporting the mover which is movable in the first direction; and
   a resonator that is vibratable, at least a part of the resonator being embedded in the supporter, the resonator being diffused with impurities which are smaller in atomic radius than silicon so that the resonator has a tensile strain in the second direction preliminarily, the second direction being perpendicular to a third direction in which the resonator vibrates.

2. The resonant sensor according to claim 1, wherein the mover, the fixer, the supporter, and the resonator are formed as a single-piece of silicon material.

3. The resonant sensor according to claim 2, wherein the resonator comprises silicon,
   the resonator is a beam extending in the second direction,
   at least a part of the resonator is disposed in a space which is in the supporter, and
   both ends of the resonator are fixed.

4. The resonant sensor according to claim 1, further comprising:
   a temperature detecting resonator that is embedded in the fixer, the temperature detecting resonator detecting temperature.

5. The resonant sensor according to claim 1, further comprising:
   a damping member that is disposed adjacent to the mover with a gap.

6. The resonant sensor according to claim 5, wherein the resonator is vacuum-sealed, and
   sealing pressure of the resonator and pressure in the gap are set to be different from each other.

7. The resonant sensor according to claim 1, wherein the resonator is vacuum-sealed.

8. The resonant sensor according to claim 1, wherein the supporter comprises a plurality of supporters which are connected to the mover and the fixer, at least a part of the resonator being embedded in the plurality of the supporters.

9. The resonant sensor according to claim 8, further comprising:
   at least one auxiliary supporter in which the resonator is not embedded, the auxiliary supporter being connected to the mover and the fixer.

10. The resonant sensor according to claim 1, wherein the resonator comprises a plurality of resonators including a first resonator and a second resonator,
   a direction from a position of the first resonator to a position of the second resonator is perpendicular to the second direction, and
   at least a part of the plurality of the resonators is embedded in the supporter.

11. The resonant sensor according to claim 1, wherein the fixer surrounds the mover in a plane perpendicular to the first direction.

12. The resonant sensor according to claim 11, further comprising:
   a sealer that is bonded to the fixer, the sealer sealing the mover, the supporter, and the resonator.

13. The resonant sensor according to claim 1, wherein the mover surrounds the fixer in a plane perpendicular to the first direction.

14. The resonant sensor according to claim 1, wherein both ends of the supporter, in which the resonator is embedded, are bonded to the mover and the fixer respectively.

15. The resonant sensor according to claim 1, further comprising:
   an input electrode to which an exciting signal for vibrating the resonator is input, and
   an output electrode configured to receive a signal being the same in frequency as resonant frequency of the resonator,
   wherein the input electrode and the output electrode are spatially separated in a third direction perpendicular to the first and second directions, and the resonator is disposed between the input electrode and the output electrode.

16. The resonant sensor according to claim 1, wherein the movable part is a weight which is movable in the first direction, and
   the support part is a spring which supports the weight.

* * * * *